US012743377B2

(12) United States Patent
Foley

(10) Patent No.: US 12,743,377 B2
(45) Date of Patent: Sep. 22, 2026

(54) PARALLEL PROCESSING ARCHITECTURE WITH BLOCK MOVE SUPPORT

(71) Applicant: Ascenium, Inc., Mountain View, CA (US)

(72) Inventor: Peter Foley, Los Altos Hills, CA (US)

(73) Assignee: Ascenium, Inc., Mountain View, CA (US)

( * ) Notice: Subject to any disclaimer, the term of this patent is extended or adjusted under 35 U.S.C. 154(b) by 0 days.

(21) Appl. No.: 18/785,026

(22) Filed: Jul. 26, 2024

(65) Prior Publication Data

US 2024/0385965 A1 Nov. 21, 2024

Related U.S. Application Data

(63) Continuation-in-part of application No. 17/526,003, filed on Nov. 15, 2021, which is a
(Continued)

(51) Int. Cl.
*G06F 12/08* (2016.01)
*G06F 9/54* (2006.01)
*G06F 12/084* (2016.01)

(52) U.S. Cl.
CPC ............ *G06F 12/084* (2013.01); *G06F 9/544* (2013.01); *G06F 2212/6042* (2013.01); *G06F 2212/62* (2013.01)

(58) Field of Classification Search
CPC ................... G06F 12/084; G06F 9/544; G06F 2212/6042; G06F 2212/62;
(Continued)

(56) References Cited

U.S. PATENT DOCUMENTS 5,594,884 A 1/1997 Matoba et al.
5,764,994 A 6/1998 Craft
(Continued)

FOREIGN PATENT DOCUMENTS

KR 10-2015-0051083 A 5/2015
WO WO2011038940 A1 4/2011
(Continued)

OTHER PUBLICATIONS

International Search Report dated Nov. 13, 2024 for PCT/US2024/039674.
(Continued)

*Primary Examiner* — Masud K Khan
(74) *Attorney, Agent, or Firm* — Adams Intellex, PLC

(57) ABSTRACT

Techniques for task processing are disclosed. An array of compute elements is accessed. Each compute element within the array is known to a compiler and is coupled to its neighboring compute elements. The array of compute elements is coupled to at least one data cache. The data cache provides memory storage for the array. Control for the compute elements is provided on a cycle-by-cycle basis. Control is enabled by a stream of wide control words generated by the compiler. A load address and a store address are generated. The load and the store addresses comprise memory block move addresses. The memory block move addresses point to memory storage locations in the data cache. A memory block move is executed, based on the memory block move addresses. The data for the memory block move is transferred outside of the array.

21 Claims, 8 Drawing Sheets

Related U.S. Application Data continuation-in-part of application No. 17/465,949, filed on Sep. 3, 2021.

(60) Provisional application No. 63/536,144, filed on Sep. 1, 2023, provisional application No. 63/529,159, filed on Jul. 27, 2023, provisional application No. 63/254,557, filed on Oct. 12, 2021, provisional application No. 63/232,230, filed on Aug. 12, 2021, provisional application No. 63/229,466, filed on Aug. 4, 2021, provisional application No. 63/193,522, filed on May 26, 2021, provisional application No. 63/166,298, filed on Mar. 26, 2021, provisional application No. 63/125,994, filed on Dec. 16, 2020, provisional application No. 63/114,003, filed on Nov. 16, 2020, provisional application No. 63/091,947, filed on Oct. 15, 2020, provisional application No. 63/075,849, filed on Sep. 9, 2020.

(58) Field of Classification Search

CPC ........... G06F 2212/1024; G06F 9/3826; G06F 9/3834; G06F 9/3838; G06F 9/3885; G06F 2209/521; G06F 9/52; G06F 2212/1016; G06F 12/0811; G06F 8/445

See application file for complete search history.

(56) References Cited

U.S. PATENT DOCUMENTS

| | | | | |
|---|---|---|---|---|
| 6,026,239 | A | 2/2000 | Patrick et al. | |
| 7,840,777 | B2 | 11/2010 | Mykland | |
| 8,677,081 | B1 | 3/2014 | Wentzlaff et al. | |
| 8,694,978 | B1 | 4/2014 | Rus et al. | |
| 8,856,768 | B2 | 10/2014 | Mykland | |
| 8,869,123 | B2 | 10/2014 | Mykland | |
| 8,949,806 | B1 | 2/2015 | Lee et al. | |
| 9,158,544 | B2 | 10/2015 | Mykland | |
| 9,304,770 | B2 | 4/2016 | Mykland | |
| 9,395,992 | B2 | 7/2016 | Doing et al. | |
| 9,424,055 | B2 | 8/2016 | Lundvall et al. | |
| 9,473,155 | B2 | 10/2016 | Staszewski et al. | |
| 9,477,470 | B2 | 10/2016 | Mykland | |
| 9,529,715 | B2 | 12/2016 | Kumar et al. | |
| 9,582,277 | B2 | 2/2017 | Muff et al. | |
| 9,594,559 | B2 | 3/2017 | Fontenot et al. | |
| 9,600,287 | B2 | 3/2017 | Gschwind et al. | |
| 9,633,160 | B2 | 4/2017 | Mykland | |
| 9,652,238 | B2 | 5/2017 | Muff et al. | |
| 9,684,511 | B2 | 6/2017 | Shanbhogue et al. | |
| 9,830,164 | B2 | 11/2017 | Yazdani | |
| 9,851,969 | B2 | 12/2017 | Greiner et al. | |
| 9,886,277 | B2 | 2/2018 | Loktyukhin et al. | |
| 9,898,293 | B2 | 2/2018 | Whittaker | |
| 9,921,836 | B2 | 3/2018 | Kumar et al. | |
| 9,928,062 | B2 | 3/2018 | Azagury et al. | |
| 9,934,040 | B2 | 4/2018 | Bonanno et al. | |
| 9,946,547 | B2 | 4/2018 | Yu et al. | |
| 9,971,605 | B2 | 5/2018 | Henry et al. | |
| 9,977,674 | B2 | 5/2018 | Rupley, II et al. | |
| 9,977,675 | B2 | 5/2018 | Nystad | |
| 9,977,679 | B2 | 5/2018 | Caulfield et al. | |
| 9,983,882 | B2 | 5/2018 | Greiner et al. | |
| 9,983,884 | B2 | 5/2018 | Maiyuran et al. | |
| 10,089,277 | B2 | 10/2018 | Mykland | |
| 10,540,584 | B2 | 1/2020 | McBride et al. | |
| 10,922,146 | B1 | 2/2021 | Minkin et al. | |
| 11,163,486 | B2 | 11/2021 | Bavishi et al. | |
| 2002/0169938 | A1 | 11/2002 | Scott et al. | |
| 2002/0174318 | A1 | 11/2002 | Studdard et al. | |
| 2003/0196072 | A1* | 10/2003 | Chinnakonda | G06F 9/3885 712/32 |
| 2004/0111710 | A1 | 6/2004 | Chakradhar et al. | |
| 2013/0326190 | A1 | 12/2013 | Chung et al. | |
| 2014/0149657 | A1 | 5/2014 | Jakovljevic et al. | |
| 2014/0317383 | A1 | 10/2014 | Park et al. | |
| 2015/0039855 | A1* | 2/2015 | Pechanek | G06F 9/3888 712/11 |
| 2015/0127921 | A1 | 5/2015 | Choi et al. | |
| 2015/0186146 | A1 | 7/2015 | Kushida et al. | |
| 2016/0246602 | A1 | 8/2016 | Radhika et al. | |
| 2018/0225116 | A1 | 8/2018 | Henry et al. | |
| 2018/0307980 | A1 | 10/2018 | Barik et al. | |
| 2018/0322606 | A1 | 11/2018 | Das et al. | |
| 2018/0341493 | A1 | 11/2018 | Roy et al. | |
| 2019/0004777 | A1 | 1/2019 | Meixner | |
| 2019/0347190 | A1 | 11/2019 | Singh | |
| 2019/0369990 | A1 | 12/2019 | Doerr et al. | |
| 2020/0026498 | A1 | 1/2020 | Sumbul et al. | |
| 2020/0241879 | A1 | 7/2020 | Vorbach et al. | |
| 2021/0263854 | A1* | 8/2021 | Ingalls | G06F 12/0888 |
| 2022/0050624 | A1 | 2/2022 | Bavishi et al. | |
| 2022/0121450 | A1* | 4/2022 | Brewer | G06F 9/3869 |

FOREIGN PATENT DOCUMENTS

| | | | |
|---|---|---|---|
| WO | WO2020252763 | A1 | 6/2019 |
| WO | WO0233565 | A2 | 4/2022 |

OTHER PUBLICATIONS

Chang, Kyungwook, and Kiyoung Choi. "Mapping control intensive kernels onto coarse-grained reconfigurable array architecture." 2008 International SoC Design Conference. vol. 1. IEEE, 2008.

Musicus, B. R. (1988). The OKI advanced array processor (AAP): Development Software Manual.

* cited by examiner

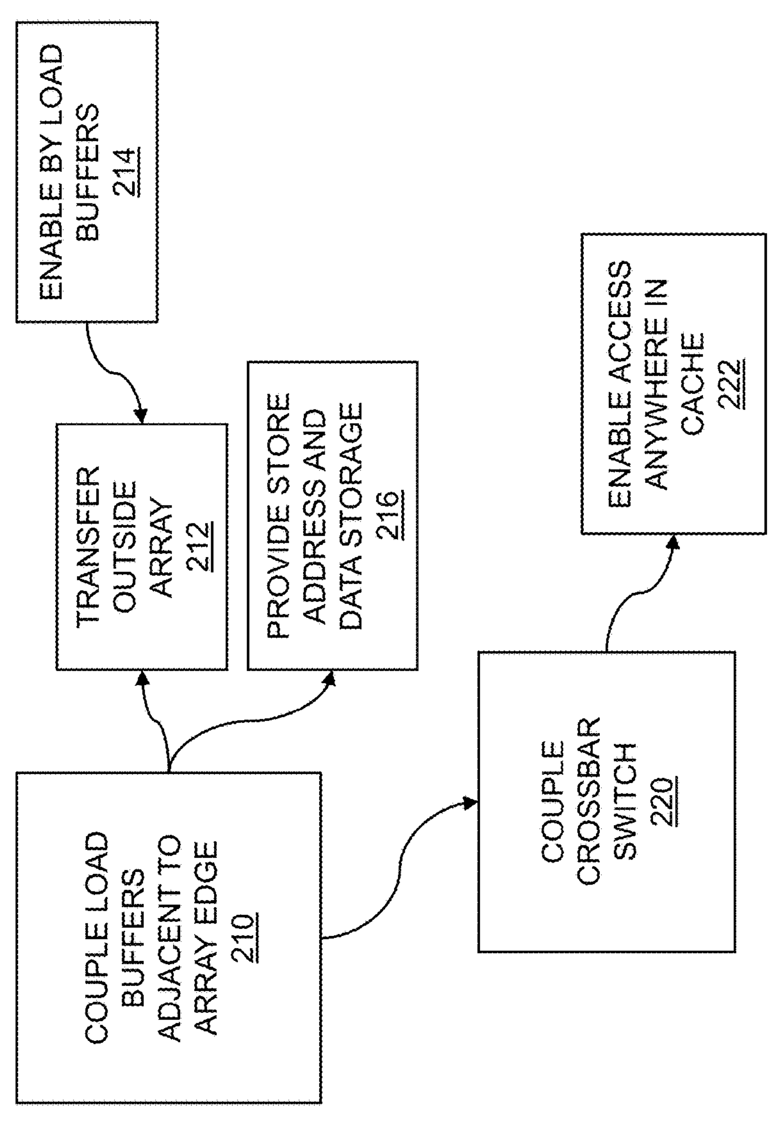
FIG. 2

Figure 4:
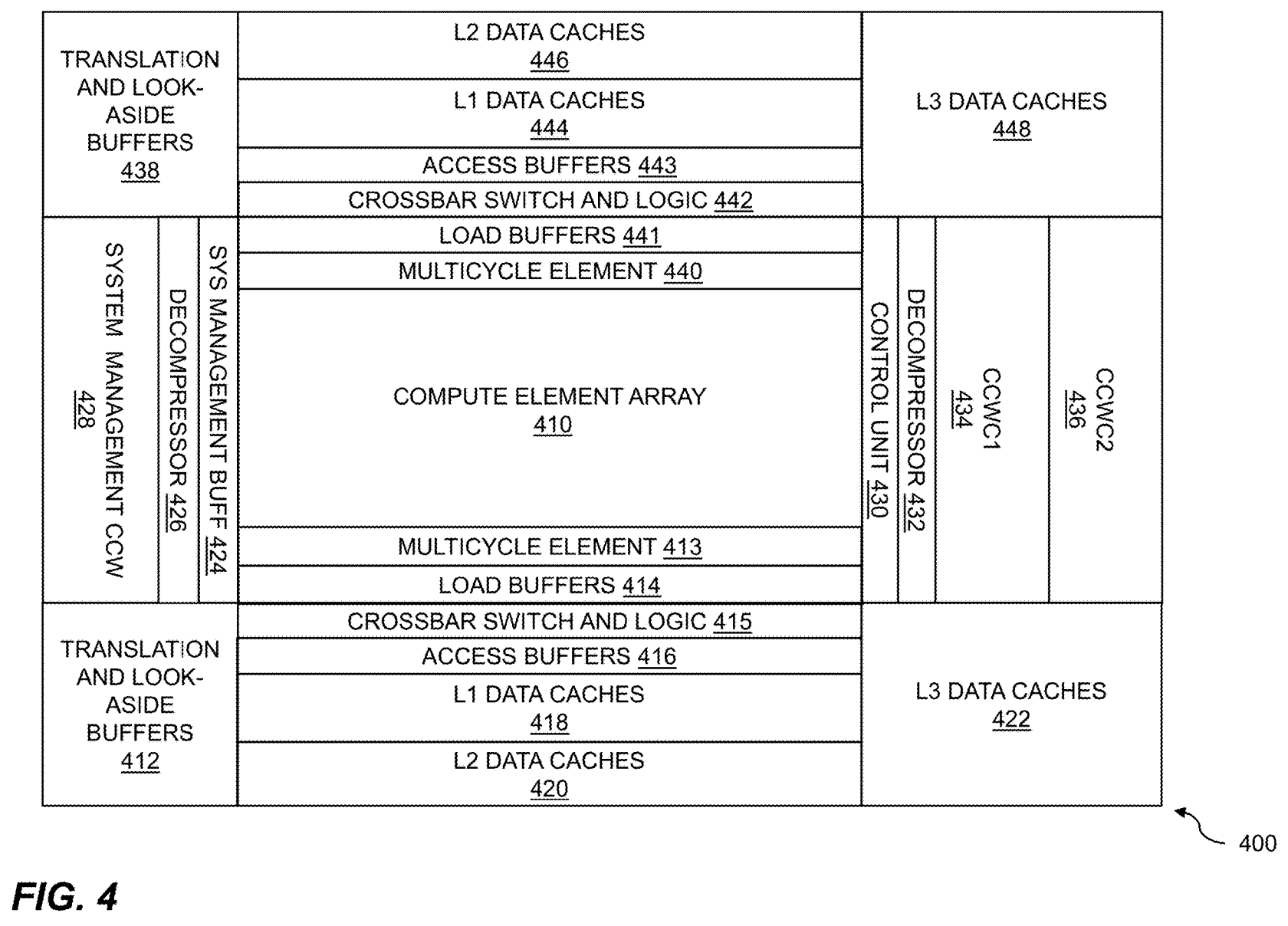

400

L3 DATA CACHES 448

CCWC2 436

CCWC1 434

DECOMPRESSOR 432

CONTROL UNIT 430

L3 DATA CACHES 422

L2 DATA CACHES 446

L1 DATA CACHES 444

ACCESS BUFFERS 443

CROSSBAR SWITCH AND LOGIC 442

LOAD BUFFERS 441

MULTICYCLE ELEMENT 440

COMPUTE ELEMENT ARRAY 410

MULTICYCLE ELEMENT 413

LOAD BUFFERS 414

CROSSBAR SWITCH AND LOGIC 415

ACCESS BUFFERS 416

L1 DATA CACHES 418

L2 DATA CACHES 420

TRANSLATION AND LOOK-ASIDE BUFFERS 438

SYS MANAGEMENT BUFF 424

DECOMPRESSOR 426

SYSTEM MANAGEMENT CCW 428

TRANSLATION AND LOOK-ASIDE BUFFERS 412

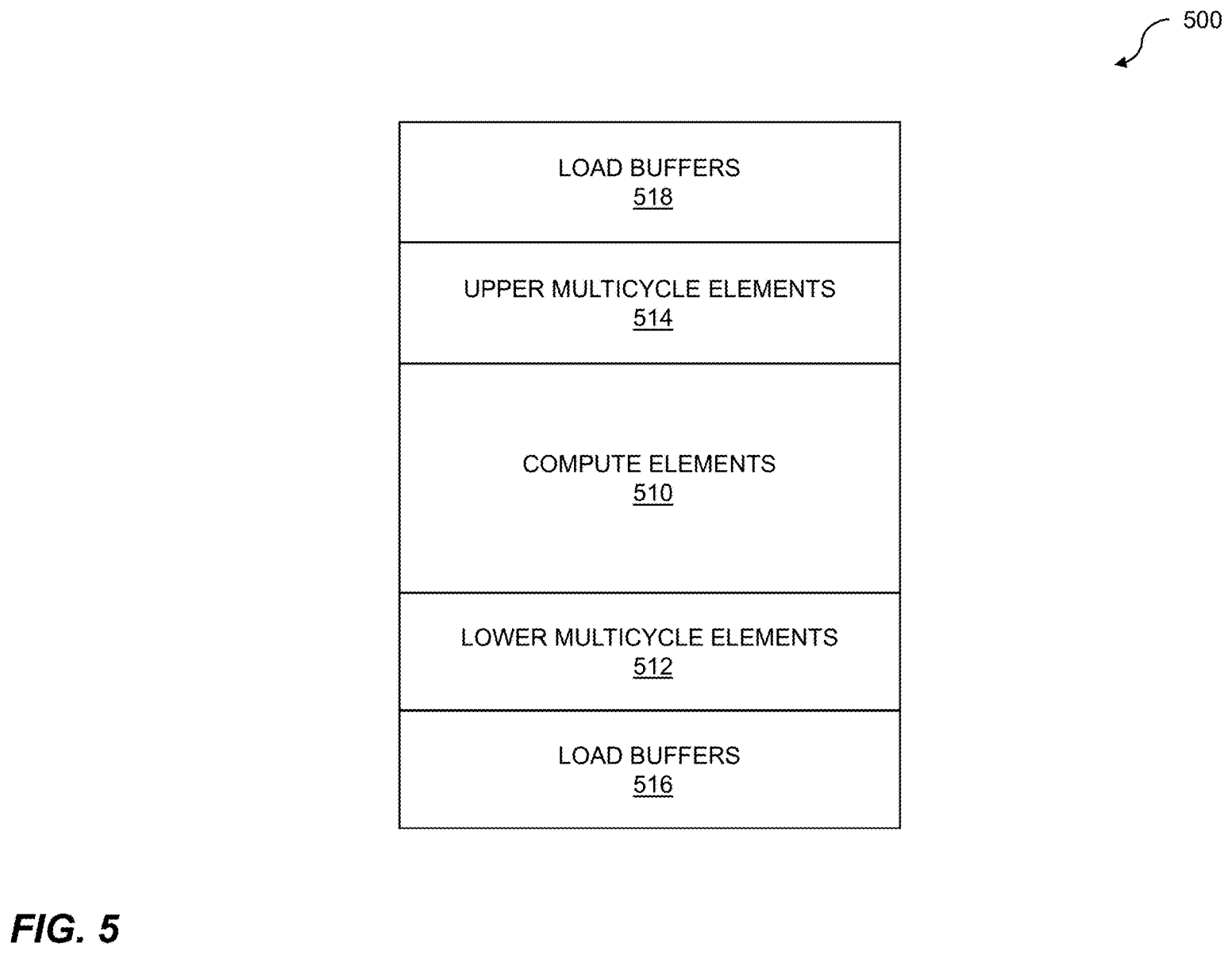

LOAD BUFFERS 518

UPPER MULTICYCLE ELEMENTS 514

COMPUTE ELEMENTS 510

LOWER MULTICYCLE ELEMENTS 512

LOAD BUFFERS 516

FIG. 5

COMPUTE ELEMENT ARRAY 610

LOAD BUFFERS 612

MEMORY BLOCK TRANSFER CONTROL LOGIC 614

CROSSBAR 616

ACCESS BUFFERS 618

LINE TRANSFER BUSES 620

L1 DATA CACHE 622

L2 DATA CACHE 624

UNIFIED L3 CACHE 626

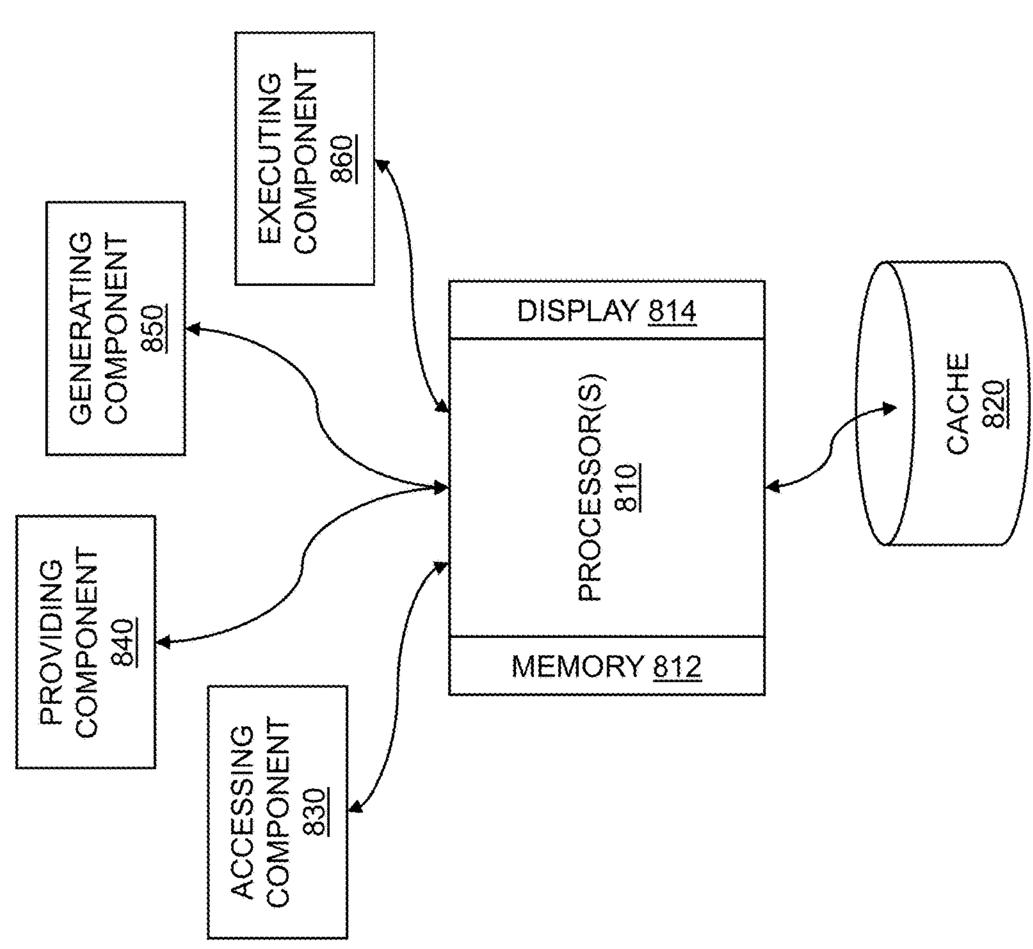
FIG. 8

PARALLEL PROCESSING ARCHITECTURE WITH BLOCK MOVE SUPPORT

RELATED APPLICATIONS

This application claims the benefit of U.S. provisional patent applications "Parallel Processing Architecture With Block Move Support" Ser. No. 63/529,159, filed Jul. 27, 2023 and "Parallel Processing Architecture With Block Move Backpressure" Ser. No. 63/536,144, filed Sep. 1, 2023.

This application is also a continuation-in-part of U.S. patent application "Highly Parallel Processing Architecture With Compiler" Ser. No. 17/526,003, filed Nov. 15, 2021, which claims the benefit of U.S. provisional patent applications "Highly Parallel Processing Architecture With Compiler" Ser. No. 63/114,003, filed Nov. 16, 2020, "Highly Parallel Processing Architecture Using Dual Branch Execution" Ser. No. 63/125,994, filed Dec. 16, 2020, "Parallel Processing Architecture Using Speculative Encoding" Ser. No. 63/166,298, filed Mar. 26, 2021, "Distributed Renaming Within A Statically Scheduled Array" Ser. No. 63/193,522, filed May 26, 2021, "Parallel Processing Architecture For Atomic Operations" Ser. No. 63/229,466, filed Aug. 4, 2021, "Parallel Processing Architecture With Distributed Register Files" Ser. No. 63/232,230, filed Aug. 12, 2021, and "Load Latency Amelioration Using Bunch Buffers" Ser. No. 63/254,557, filed Oct. 12, 2021.

The U.S. patent application "Highly Parallel Processing Architecture With Compiler" Ser. No. 17/526,003, filed Nov. 15, 2021 is also a continuation-in-part of U.S. patent application "Highly Parallel Processing Architecture With Shallow Pipeline" Ser. No. 17/465,949, filed Sep. 3, 2021, which claims the benefit of U.S. provisional patent applications "Highly Parallel Processing Architecture With Shallow Pipeline" Ser. No. 63/075,849, filed Sep. 9, 2020, "Parallel Processing Architecture With Background Loads" Ser. No. 63/091,947, filed Oct. 15, 2020, "Highly Parallel Processing Architecture With Compiler" Ser. No. 63/114,003, filed Nov. 16, 2020, "Highly Parallel Processing Architecture Using Dual Branch Execution" Ser. No. 63/125,994, filed Dec. 16, 2020, "Parallel Processing Architecture Using Speculative Encoding" Ser. No. 63/166,298, filed Mar. 26, 2021, "Distributed Renaming Within A Statically Scheduled Array" Ser. No. 63/193,522, filed May 26, 2021, Parallel Processing Architecture For Atomic Operations" Ser. No. 63/229,466, filed Aug. 4, 2021, and "Parallel Processing Architecture With Distributed Register Files" Ser. No. 63/232,230, filed Aug. 12, 2021.

Each of the foregoing applications is hereby incorporated by reference in its entirety.

FIELD OF ART

This application relates generally to task processing and more particularly to a parallel processing architecture with block move support.

BACKGROUND

Organizations hold data to be among their most valuable and highly protected assets. The sets of data or "datasets" are immense and often unstructured. The datasets are processed to achieve organizational missions and purposes including commercial, educational, governmental, medical, research, or retail purposes, to name only a few. The datasets can be analyzed for forensic and law enforcement purposes. Large and complex computational resources are used to process data to meet organizational needs, irrespective of organizational size or global reach. The computational resources include processors, data storage units, networking and communications equipment, telephony, power conditioning units, HVAC equipment, backup power units, and other essential equipment. Energy resource management is critical because the computational resources consume vast amounts of energy and produce prodigious heat. These resources are located in special-purpose, often high security, installations. These installations more closely resemble high-security bases or even vaults than traditional office buildings. Not every organization requires vast computational equipment installations. However, all strive to provide resources to meet their data processing needs as quickly and cost effectively as possible.

The organizations execute a wide variety of processing jobs including billing and payroll, generating profit and loss statements, processing tax returns or election results, controlling experiments, analyzing research data, and generating academic grades, among others. The types of data processed derive from the organizational missions. The processing jobs consume computational resources in installations that typically operate 24×7×365. These processing jobs must be executed quickly, accurately, and cost-effectively. The processed datasets can be very large and unstructured, thereby saturating conventional computational architectures. An entire dataset may be processed to find a critical data element. Effective dataset processing enables rapid and accurate identification of potential customers, or finetuning production and distribution systems, among other results that yield a competitive advantage to the organization. Ineffective processing wastes money by losing sales or failing to streamline a process, thereby inflating costs.

Organizational data is accumulated by implementing various data collection techniques. The data is collected from widely diverse categories of individuals. Legitimate data collection techniques include "opt-in" strategies, where an individual signs up, creates an account, registers, or otherwise actively and willingly agrees to participate in the data collection. Some techniques are legislative, where citizens are required by a government to obtain a registration number to interact with government agencies, law enforcement, emergency services, and others. At other times, the individuals are unwitting subjects of data collection. Still other data collection techniques are more subtle or completely hidden, such as tracking purchase histories, website visits to various websites, button clicks, and menu choices. Theft has also been used to collect data. Irrespective of the techniques used for the data collection, the collected data is highly valuable to the organizations when processed rapidly and accurately.

SUMMARY

Tasks and subtasks can be processed using arrays of elements in order to greatly improve processing efficiency and data throughput. The element arrays include compute elements; multicycle elements for multiplication, division, and square root computations; registers; caches; queues; register files; buffers; controllers; decompressors; arithmetic logic units (ALUs); storage elements; scratchpads; and other components. The components can communicate among themselves using buses or networks to exchange instructions, data, signals, and so on. These arrays of elements are configured and operated by providing control to the array of elements on a cycle-by-cycle basis. The control of the array is accomplished by providing a stream of wide control words generated by a compiler. The control words can include wide microcode control words generated by the compiler. The wide control words can comprise variable length control words. The variable length can be a result of a run-length type encoding technique, which can exclude, for example, information for array resources that are not used for processing a given task or subtask. A control word from the stream of wide control words can control a memory block move. A control word can include a load target start address, a store target start address, a block size, and a stride. Each control word can include, at the start of the control word, an offset to the next control word, which makes this type of variable length encoding efficient from a fetch and decompress pipeline standpoint.

Task processing is enabled by a parallel processing architecture with block move support. The parallel processing architecture includes an array of compute elements. A memory block move is executed based on memory block addresses, where the memory block addresses include a load address and a store address. The memory block addresses point to memory storage locations within at least one data cache. The parallel processing architecture with block move support enables the memory block move from a data cache to a data cache. Further, data for the memory block move is transferred outside of the array of compute elements. The memory block move is executed as a pseudo-atomic operation, where the memory access operations associated with the pseudo-atomic operation are ordered. The ordering of the operations associated with the pseudo-atomic operation provides memory hazard detection and mitigation. Hazards such as write-after-read, read-after-write, and write-after-write conflicts can be detected and mitigated.

A processor-implemented method for task processing is disclosed comprising: accessing an array of compute elements, wherein each compute element within the array of compute elements is known to a compiler and is coupled to its neighboring compute elements within the array of compute elements, wherein the array of compute elements is coupled to at least one data cache, wherein the data cache provides memory storage for the array of compute elements; providing control for the array of compute elements on a cycle-by-cycle basis, wherein the control is enabled by a stream of wide control words generated by the compiler; generating a load address and a store address, wherein the load address and the store address comprise memory block move addresses, and wherein the memory block move addresses point to memory storage locations in the at least one data cache; and executing a memory block move, based on the memory block move addresses, wherein data for the memory block move is transferred outside of the array of compute elements. In embodiments, the load address and the store address are generated in a same cycle. A cycle can include an array cycle. In embodiments, the memory block move includes a data cache to data cache transfer. The data cache to data cache transfer enables the memory block move without having to move the memory block into the array of compute elements before then moving the memory block to a different location in the data cache. In embodiments, the memory block move is executed as a pseudo-atomic operation. The pseudo-atomic operation can include a sequence of storage access operations such as data cache access operations. In embodiments, the pseudo-atomic operation provides memory hazard detection and mitigation.

Various features, aspects, and advantages of various embodiments will become more apparent from the following further description.

BRIEF DESCRIPTION OF THE DRAWINGS

The following detailed description of certain embodiments may be understood by reference to the following figures wherein:

FIG. 2 is a flow diagram for enabling memory block moves.

FIG. 4 illustrates a system block diagram for a highly parallel architecture with a shallow pipeline.

FIG. 5 shows compute element array detail.

FIG. 8 is a system diagram for a parallel processing architecture with block move support.

DETAILED DESCRIPTION

Figure 1:
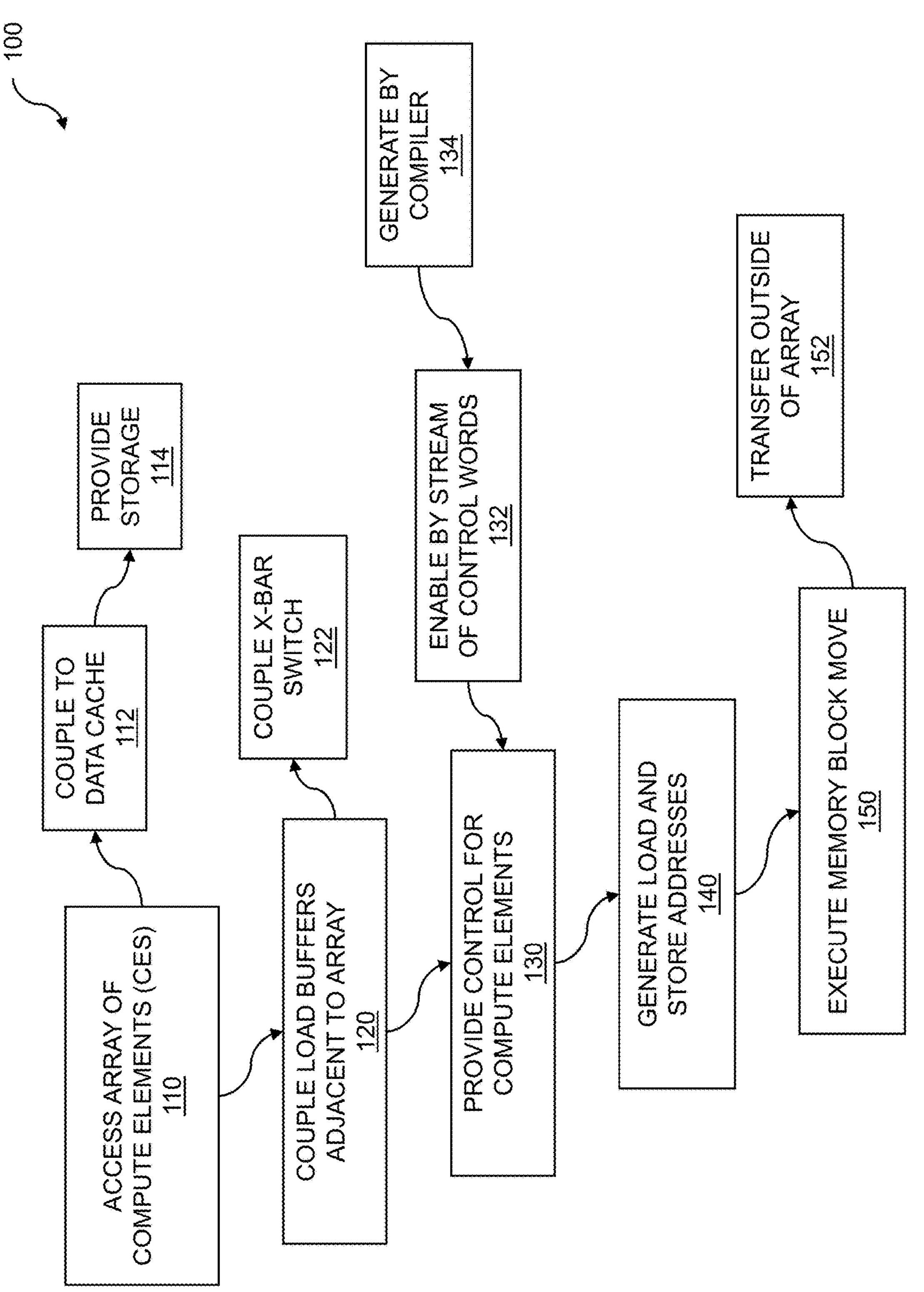
FIG. 1 is a flow diagram for a parallel processing architecture with block move support.

Organizations support their various missions and purposes by processing proprietary datasets. The datasets are typically large, varied, and often include unstructured data. Typical organizational purposes include commercial, educational, governmental, medical, research, or retail purposes, to name only a few. Further, some datasets are analyzed for forensic, law enforcement, emergency response, and military purposes. The organizations, which range in size from sole proprietor operations to large, international organizations, obtain and deploy significant computational resources to meet data processing needs. The computational resources include processors, data storage units, networking and communications equipment, telephony, power conditioning units, HVAC equipment, and backup power units, among other essential equipment. Energy resource management is also critical due to vast energy consumption and the production of copious heat. The computational resources are often housed in special-purpose, and frequently high security, installations. These installations more closely resemble high-security sites or even vaults than traditional office buildings. While not every organization requires vast computational equipment installations, all strive to provide resources to meet their data processing needs as quickly and cost effectively as possible.

Techniques for task processing using a parallel processing architecture with block move support are disclosed. A parallel processing architecture, such as an architecture based on configurable compute elements as described herein, can be used to execute in parallel one or more of a process, a task, a subtask, and so on. Execution of processes, tasks, or subtasks, etc. can include loading data and control words, processing data, and writing data. Dependencies can exist between tasks and subtasks, for example, which require that data be loaded, processed, and stored in an order that ensures valid results. Thus, the loading of data, control words, compute element operations, and so on can cause execution of a process, task, subtask, and the like to stall operations in the array. The stalling can occur when data that is required by an operation executing on a compute element is late, invalid, or otherwise unavailable. The data that is required can include data already located in storage such as a data cache, but the data can be located in a different location than referenced by the operation.

The stalling can be a particularly complex issue when the accessing of data is based on operations that include at least one branch operation. In order to speed execution, memory access requests associated with two or more sides of the branch operation can be generated so that each side of the branch can begin execution in parallel prior to the branch decision being determined. Once the branch decision is made, execution of the taken side of the branch can proceed while all other sides of the branch are halted. However, memory access operations can remain in process at the point at which the branch decision is made. Memory access operations associated with untaken sides can be terminated. Since each memory access operation consumes some computational resources, such as access to a bus, crossbar switch, cache memory, memory system, etc., memory access latency is affected.

Discussed throughout, memory access includes executing a memory block transfer or move. The memory block move can be accomplished within a storage element such as a cache storage, where the cache storage includes a data cache. The memory block move is accomplished between addresses within the cache without having to transfer the memory block from the cache into an array of configurable compute elements, and then back out from the compute elements to the cache. Instead, the memory block move can be accomplished using load buffers coupled to the array of configurable compute elements. The memory block moves, along with other memory access operations such as load, store, read-modify-write, etc., can be implemented by enabling memory access hazard detection and mitigation. The memory hazard detection and mitigation can ensure that valid data is available in time for processing, that valid data is not overwritten before it can be loaded or stored, and so on. The memory access hazard detection and mitigation is accomplished for the memory block moves by executing the memory block move as a pseudo-atomic operation. An atomic operation orders memory access operations such as load accesses and store accesses. The ordering of the accesses provides memory hazard detection and mitigation. For other memory access operations such as loading data into the array, hazard detection and mitigation can be accomplished by using a precedence tag. A precedence tag can be associated with a control word, and the control word and the associated precedence tag can be provided by a compiler at compile time. The precedence tag can include a memory operation number, an elapsed cycle return count, and so on. The precedence tag can further include a unique set of precedence information. The unique set of precedence information can indicate an order of operations execution, can support multiple control word memory accesses, and the like. The multiple control word memory accesses, which can be designated as a safe or unsafe memory access, can include loads from a data cache, loading one or more constant values, etc. A safe load can include a read probe to find data in a cache, a multi-level cache, a memory system, and so on.

Stalling of a task due to unavailable data can cause execution of a single compute element to halt or suspend, which requires the entire array to stall. The stalling occurs because the hardware must be kept in synchronization with compiler expectations on an architectural cycle basis, described later. The halting or suspending can continue while needed data is stored or fetched or completes operation. The compute element array as a whole stalls if external memory cannot supply data in time or if a new control word cannot be fetched and/or decompressed in time, for example. In addition, a multicycle, nondeterministic duration operation in a multicycle element (MEM), such as a divide operation, may take longer than scheduled to complete, in which case the compute element array would stall while waiting for the MEM operation to complete (when that result is to be taken into the array as an operand). Noted throughout, control for the array of compute elements is provided on a cycle-by-cycle basis. The control can be based on one or more sets of control words. The control words can include short words, long words, and so on. The control that is provided to the array of compute elements is enabled by a stream of wide control words generated by a compiler. The control words can be of variable length. The compiler can include a general-purpose compiler, a hardware description compiler, a specialized compiler, etc. The control words comprise compute element operations. The control words can be of variable length, as described by the architecture, or they can be of a fixed length. However, a fixed length control word can be compressed, which can result in variable lengths for operational usage to save space. At least two operations that can be contained in one or more control words can be loaded into buffers. The buffers can include autonomous operation buffers. The control words can include control word bunches, which can provide operational control of a particular compute element. The control words can be loaded into an autonomous operation buffer. Additional autonomous operation buffers can be loaded with additional operations contained in the one or more control words. The autonomous operation buffer and the additional autonomous operation buffers can be integrated into one or more compute elements. The control word bits provide operational control for the compute element. In addition to providing control to the compute elements within the array, data can be transferred or "preloaded" into caches, registers, and so on prior to executing the tasks or subtasks that process the data.

Sides of a branch operation can be executed in parallel while a branch decision is being made. The executing is accomplished by mapping a plurality of compute elements within the array of compute elements. The mapping is determined by a compiler at compile time. The mapping the compute elements can include configuring and scheduling the compute elements to execute operations associated with the sides of the branch. The mapping distributes parallelized operations to the plurality of compute elements. The distributed parallelized operations can enable the parallel execution of the sides of the branch operation. The mapping, including a column of compute elements within the plurality of compute elements, is enabled to perform vertical data access suppression and a row of compute elements is enabled to perform horizontal data access suppression. The data access suppression can prevent data accesses from being executed and can prevent the data accesses from leaving the array of compute elements. The branch decision determines which branch path or branch side to take based on evaluating an expression. The expression can include a logical expression, a mathematical expression, and so on. When the branch decision is determined, the selected branch side can continue executing while other sides of the branch can be suspended, halted, and the like. Since the operations associated with each side of the branch can include data access operations, data access operations associated with each side can be pending when the branch decision is determined or made. Data access operations associated with the untaken branch sides can be suppressed. The data access suppressing can be based on the branch decision and an invalid indication. The invalid indication can be based on a bit, a flag, a semaphore, a signal, etc.

Buffers for storing control words can be based on storage elements, registers, etc. The registers can be based on a memory element with two read ports and one write port (2R1 W). The 2R1 W memory element enables two read operations and one write operation to occur substantially simultaneously. A plurality of buffers based on a 2R1 W register can be distributed throughout the array. The control words can be written to one or more buffers associated with each compute element within the 2D array of compute elements. The control words can configure the compute elements, enable the compute elements to execute operations autonomously within the array, and so on. The control words can include a number of operations that can accomplish some or all of the operations associated with a task, a subtask, and so on. Two or more compute element operations contained in one or more control words can be loaded into an autonomous operation buffer. The compute element operations or additional compute element operations can be loaded into additional autonomous operation buffers. By providing a sufficient number of operations into the operation buffer, autonomous operation of the compute element can be accomplished. The autonomous operation of the compute element can be based on the compute element operation counter keeping track of cycling through the autonomous operation buffer. The keeping track of cycling through the autonomous operation buffer is enabled without additional control word loading into the buffers. Recall that latency associated with access by a compute element to storage, that is, memory external to a compute element or to the array of compute elements, can be significant and can cause the compute element array to stall. By performing operations without additional loading of control words, control word load latency can be eliminated, thus expediting the execution of operations.

Tasks and subtasks that are executed by the compute elements within the array of compute elements can be associated with a wide range of applications. The applications can be based on data manipulation, such as image, video, or audio processing applications; AI applications; business applications; data processing and analysis; and so on. The tasks that are executed can perform a variety of operations including arithmetic operations, shift operations, logical operations including Boolean operations, vector or matrix operations, tensor operations, and the like. The subtasks can be executed based on precedence, priority, coding order, amount of parallelization, data flow, data availability, compute element availability, communication channel availability, and so on.

The data manipulations are performed on an array of compute elements (CEs). The compute elements within the array can be implemented with central processing units (CPUs), graphics processing units (GPUs), application specific integrated circuits (ASICs), field programmable gate arrays (FPGAs), processing cores, or other processing components or combinations of processing components. The compute elements can include heterogeneous processors, homogeneous processors, processor cores within an integrated circuit or chip, etc. The compute elements can be coupled to local storage, which can include local memory elements, register files, cache storage, etc. The cache, which can include a hierarchical cache such as an L1, L2, and L3 cache, can be used for storing data such as intermediate results, compressed control words, coalesced control words, decompressed control words, compute element operations, relevant portions of a control word, and the like. The cache can store data produced by a taken branch path, where the taken branch path is determined by a branch decision. The decompressed control word is used to control one or more compute elements within the array of compute elements. Multiple layers of the two-dimensional (2D) array of compute elements can be "stacked" to comprise a three-dimensional array of compute elements.

The tasks, subtasks, etc., that are associated with processing operations are generated by a compiler. The compiler can include a general-purpose compiler, a hardware description-based compiler, a compiler written or "tuned" for the array of compute elements, a constraint-based compiler, a satisfiability-based compiler (SAT solver), and so on. Control is provided to the hardware in the form of control words, where one or more control words are generated by the compiler. The control words are provided to the array on a cycle-by-cycle basis. The control words can include wide, variable length, microcode control words. The length of a microcode control word can be adjusted by compressing the control word. The compressing can be accomplished by recognizing situations where a compute element is unneeded by a task. Thus, control bits within the control word associated with the unneeded compute elements are not required for that compute element. Bits within the control word can include a unique set of precedence information that can be used to execute hazardless memory access operations.

Various control word compression techniques can also be applied. The control words can be used to route data, to set up operations to be performed by the compute elements, to idle individual compute elements or rows and/or columns of compute elements, etc. Noting that the compiled microcode control words that are generated by the compiler are based on bits, the control words can be compressed by selecting bits from the control words. Compute element operations contained in one or more control words from a number of control words can be loaded into one or more autonomous operation buffers. The contents of the buffers provide control to the compute elements. The control of the compute elements can be accomplished by a control unit. Thus, in general, the hardware is completely under compiler control, which means that the hardware and the operation of the hardware-particularly the operation of any given compute element—is controlled on a cycle-by-cycle basis by compiler-generated control words driven into the array of compute elements by a control unit. However, local compute element autonomous operation can be enabled using buffers, which can be described as "bunch buffers".

A parallel processing architecture with block move support enables task processing. The task processing can include data manipulation. An array of compute elements is accessed. The array of compute elements can include a two-dimensional (2D) array of compute elements, where the 2D array includes rows of compute elements and columns of compute elements. The compute elements can include compute elements, processors, or cores within an integrated circuit; processors or cores within an application specific integrated circuit (ASIC); cores programmed within a programmable device such as a field programmable gate array (FPGA); and so on. The compute elements can include homogeneous or heterogeneous processors. Each compute element within the array of compute elements is known to a compiler. The compiler, which can include a general-purpose compiler, a hardware-oriented compiler, or a compiler specific to the compute elements, can compile code for each of the compute elements. Each compute element is coupled to its neighboring compute elements within the array of compute elements. The coupling of the compute elements enables data communication between and among compute elements. Thus, the compiler can control data flow between and among the compute elements and can further control data commitment to memory outside of the array. The array of compute elements is coupled to at least one data cache. The data cache provides memory storage for the array of compute elements. The data cache can include one or more levels of cache memory.

Wide control words that are generated by a compiler are provided to the array. The wide control words are used to control elements within an array of compute elements on a cycle-by-cycle basis. The control is enabled by a stream of wide control words generated by the compiler. The stream of wide control words can include variable length control words generated by the compiler. A plurality of compute elements within the array of compute elements is initialized based on a control word from the stream of control words. The control that is provided by the wide control words can include a branch operation. The branch operation, such as a conditional branch operation, can include an expression and two or more paths or sides. The plurality of compute elements is mapped, where the mapping distributes parallelized operations to the plurality of compute elements. The parallelized operations enable parallel execution of the sides of the branch operation. The parallelized operations can include primitive operations that can be executed in parallel. A primitive operation can include an arithmetic operation, a logical operation, a data handling operation, and so on. The mapping in each element of the plurality of compute elements can include a spatially adjacent mapping. The spatial adjacency can include pairs and quads of compute elements, regions and quadrants of compute elements, and so on. The spatially adjacent mapping comprises an M×N subarray of the array of compute elements. The primitive operations associated with the branch operations can be mapped into some or all of the compute elements. Unmapped compute elements within the M×N array can be initialized for operations unassociated with the branch operation. The spatially adjacent mapping is determined at compile time by the compiler.

In order for tasks, subtasks, and so on to execute properly, particularly in a statically scheduled architecture such as an array of compute elements, one or more operations associated with the plurality of wide control words must be executed in a semantically correct operations order. That is, the data access load and store operations associated with sides of a branch operation and with other operations must occur in an order that supports the execution of the branch, tasks, subtasks, and so on. If the data access load and store operations do not occur in the proper order, then invalid data is loaded, stored, or processed. Another consequence of "out-of-order" memory access load and store operations is that the execution of the tasks, subtasks, etc., must be halted or suspended until valid data is available, thus increasing execution time. A valid indication can be associated with data access operations to enable hardware ordering of data access loads to the array of compute elements, and data access stores from the array of compute elements. Conversely, an invalid (i.e., not valid) indication associated with data access operations can suppress data access operations. The loads and stores can be controlled locally, in hardware, by one or more control elements associated with or within the array of compute elements. The controlling in hardware is accomplished without compiler involvement beyond the compiler providing the plurality of control words that include precedence information.

FIG. 1 is a flow diagram for a parallel processing architecture with block move support. Groupings of compute elements (CEs), such as CEs assembled within an array of CEs, can be configured to execute a variety of operations associated with data processing. In embodiments, the array of compute elements comprises a two-dimensional (2D) array. The 2D array of compute elements can be organized in various configurations. In embodiments, the 2D array can include rows of compute elements and columns of compute elements. The operations executed on the array can be based on tasks and on subtasks, where the subtasks are associated with the tasks. The array can further interface with other elements such as controllers, storage elements, ALUs, memory management units (MMUs), GPUs, multicycle elements (MEMs), and so on. The operations can accomplish a variety of processing objectives such as application processing, data manipulation, data analysis, modeling and simulation, machine learning, and so on. The operations can manipulate a variety of data types including integer, real, and character data types; vectors, matrices, and arrays; tensors; etc. Control is provided to the array of compute elements on a cycle-by-cycle basis, where the control is enabled by a stream of wide control words generated by a compiler. The control words, which can include microcode control words, enable or idle various compute elements; provide data; route results between or among CEs, caches, scratchpads, and storage; and the like. The control enables compute element operation, memory access precedence, etc. Compute element operation and memory access precedence enable the hardware to properly sequence data provisioning and compute element results. The control enables execution of a compiled program on the array of compute elements.

The flow 100 includes accessing an array 110 of compute elements, wherein each compute element within the array of compute elements is known to a compiler and is coupled to its neighboring compute elements within the array of compute elements. The compute elements can be based on a variety of types of processors. The compute elements or CEs can include central processing units (CPUs), graphics processing units (GPUs), processors or processing cores within application specific integrated circuits (ASICs), processing cores programmed within field programmable gate arrays (FPGAs), and so on. In embodiments, compute elements within the array of compute elements have identical functionality. The compute elements can be arranged in pairs, quads, and so on, and can share resources within the arrangement. The compute elements can include heterogeneous compute resources, where the heterogeneous compute resources may or may not be colocated within a single integrated circuit or chip. The compute elements can be configured in a topology, where the topology can be built into the array, programmed or configured within the array, etc. In embodiments, the array of compute elements is configured by a control word that can implement a topology. The topology that can be implemented can include one or more of a systolic, a vector, a cyclic, a spatial, a streaming, or a Very Long Instruction Word (VLIW) topology. In embodiments, the array of compute elements can include a two-dimensional (2D) array of compute elements. More than one 2D array of compute elements can be accessed. Two or more arrays of compute elements can be colocated on an integrated circuit or chip, on multiple chips, and the like. In embodiments, two or more arrays of compute elements can be stacked to form a three-dimensional (3D) array. The stacking of the arrays of compute elements can be accomplished using a variety of techniques. In embodiments, the three-dimensional (3D) array can be physically stacked. The 3D array can comprise a 3D integrated circuit. In other embodiments, the three-dimensional array is logically stacked. The logical stacking can include configuring two or more arrays of compute elements to operate as if they were physically stacked.

The compute elements can further include a topology suited to machine learning computation. A topology for machine learning can include supervised learning, unsupervised learning, reinforcement learning, and other machine learning topologies. A topology for machine learning can include an artificial neural network topology. The compute elements can be coupled to other elements within the array of CEs. In embodiments, the coupling of the compute elements can enable one or more further topologies. The other elements to which the CEs can be coupled can include storage elements such as a scratchpad memory, one or more levels of cache storage, control units, multiplier units, address generator units for generating load (LD) and store (ST) addresses, buffers, register files, and so on. The compiler to which each compute element is known can include a C, C++, or Python compiler. The compiler to which each compute element is known can include a compiler written especially for the array of compute elements. The coupling of each CE to its neighboring CEs enables clustering of compute resources; sharing of array elements such as cache elements, multiplier elements, ALU elements, or control elements; communication between or among neighboring CEs; and the like.

The flow 100 includes coupling the array of compute elements to at least one data cache 112. The data cache can include a fast local memory which can be accessible to compute elements within the array of compute elements. The data cache can include a single-level cache, a multilevel cache, and so on. Each succeeding layer of a multilevel cache can be larger than a preceding layer of the cache. Succeeding layers can also be slower than preceding layers of the cache. In embodiments, the data cache can be implemented as a split data cache (discussed below). Splitting the cache can provide faster access to the cache from compute elements by shortening propagation delays. Each side of the split cache can include substantially similar data or substantially different data. In the flow 100, the data cache provides memory storage 114 for the array of compute elements. Each compute element within the array can access the data cache. The data cache can provide data to compute elements, receive processed or generated data from the compute elements, and so on.

Further embodiments can include grouping a subset of compute elements within the array of compute elements. The subset of compute elements can comprise a cluster, a collection, a group, and so on. In embodiments, the subset can include compute elements that are adjacent to at least two other compute elements within the array of compute elements. The adjacent compute elements can share array resources such as control storage, scratchpad storage, communication paths, and the like. The compute elements can further include a topology suited to machine learning functionality, where the machine learning functionality is mapped by the compiler. A topology for machine learning can include supervised learning, unsupervised learning, reinforcement learning, and other machine learning topologies. The compute elements can be coupled to other elements within the array of CEs. In embodiments, the coupling of the compute elements can enable one or more further topologies. The other elements to which the CEs can be coupled can include storage elements such as one or more levels of cache storage, control units, multiplier units, address generator units for generating load (LD) and store (ST) addresses, queues, register files, and so on. The compiler to which each compute element is known can include a C, C++, or Python compiler. The compiler to which each compute element is known can include a compiler written especially for the array of compute elements. The coupling of each CE to its neighboring CEs enables clustering of compute resources; sharing of elements such as cache elements, multiplier elements, ALU elements, or control elements; communication between or among neighboring CEs; and the like.

The flow 100 further includes coupling load buffers 120 to the array of compute elements. The load buffers are located adjacent to at least one edge of the array of compute elements. Load buffers can be shared among groups of compute elements such as pairs, quads, columns, and rows of compute elements. In embodiments, at least one load buffer can be coupled to a column of compute elements within the array. Other coupling configurations can also be used. In other embodiments, the load buffers can be located adjacent to two opposite edges of the array of compute elements. In a usage example, the load buffers located adjacent to two opposite edges of the array of compute elements are located at the top and at the bottom of columns of compute elements. The load buffers can be used for a variety of purposes. When one or more compute elements request data, the data can be obtained from a storage address. The storage address can be found in a level of a data cache or in a shared memory structure. The load buffers can hold data from the compute elements to compensate for latencies and other delays associated with storage access. In embodiments, the load buffers can provide storage for data obtained from the load address and a dataless store address. The load address, the data obtained from the load address, and the dataless store address can enable a memory block move. The flow 100 further includes coupling a crossbar switch 122 between the load buffers and the at least one data cache. The crossbar switch can provide connectivity between one or more compute elements such as a column of compute elements and one or more portions, sectors, regions, and so on of the data cache. In embodiments, the crossbar switch enables memory access anywhere within the at least one data cache. The crossbar switch can enable memory access to load addresses, data, and store addresses throughout the data cache.

The flow 100 includes providing control 130 for the compute elements on a cycle-by-cycle basis. The controlling the array can include configuration of elements such as compute elements within the array; loading and storing data; routing data to, from, and among compute elements; and so on. In embodiments, the compiler can provide static scheduling for the array of compute elements. A cycle can include a clock cycle, an architectural cycle, a system cycle, a self-timed cycle, an array cycle, and the like. In the flow 100, the control is enabled by a stream of control words 132 generated and provided by the compiler 134. The control words can include microcode control words, compressed control words, encoded control words, and the like. The "wideness" or width of the control words allows a plurality of compute elements within the array of compute elements to be controlled by a single wide control word. For example, an entire row of compute elements can be controlled by that wide control word. In embodiments, the stream of wide control words can include variable length control words generated by the compiler. The control words can be decompressed, used, etc., to configure the compute elements and other elements within the array; to enable or disable individual compute elements, rows and/or columns of compute elements; to load and store data; to route data to, from, and among compute elements; and so on. In embodiments, a control word from the stream of wide control words includes a load target start address, a store target start address, a block size, and a stride, although explicit start and end addresses can also be used. The load target start address, the store target start address, the block size, and the stride can be associated with a memory block move. The memory block move can be within a cache such as a data cache. In other embodiments, the stream of wide control words generated by the compiler can provide direct, fine-grained control of the array of compute elements. The fine-grained control of the compute elements can include enabling or idling individual compute elements, enabling or idling rows or columns of compute elements, etc.

The compiler can be used to map functionality to the array of compute elements. In embodiments, the compiler can map machine learning functionality to the array of compute elements. The machine learning can be based on a machine learning (ML) network, a deep learning (DL) network, a support vector machine (SVM), etc. In embodiments, the machine learning functionality can include a neural network (NN) implementation. The neural network implementation can include a plurality of layers, where the layers can include one or more of input layers, hidden layers, output layers, and the like. A control word generated by the compiler can be used to configure one or more CEs, to enable data to flow to or from the CE, to configure the CE to perform an operation, and so on. Depending on the type and size of a task that is compiled to control the array of compute elements, one or more of the CEs can be controlled, while other CEs are unneeded by the particular task. A CE that is unneeded can be marked in the control word as unneeded. An unneeded CE requires no data and no control word. In embodiments, the unneeded compute element can be controlled by a single bit. In other embodiments, a single bit can control an entire row of CEs by instructing hardware to generate idle signals for each CE in the row. The single bit can be set for "unneeded", reset for "needed", or set for a similar usage of the bit to indicate when a particular CE is unneeded by a task. The control words are generated by the compiler. The control words that are generated by the compiler can include a conditionality such as a branch. The branch can include a conditional branch, an unconditional branch, etc. The control words that are compressed can be decompressed by a decompressor logic block that decompresses words from a compressed control word cache on their way to the array. In embodiments, the provided control can include a spatial allocation of subtasks on one or more compute elements within the array of compute elements. In other embodiments, the set of provided control can enable multiple, simultaneous programming loop instances circulating within the array of compute elements. The multiple programming loop instances can include multiple instances of the same programming loop, multiple programming loops, etc.

The flow 100 includes generating a load address and a store address 140. The load address and the store address can comprise memory block move addresses. The memory block move addresses can point to memory storage locations in the at least one data cache. The memory storage locations pointed to by the memory block move addresses can be located in a level of a multilevel data cache, or if not in a level of the data cache, in a memory system such as a shared memory system. The data cache can be partitioned into multiple data cache banks using an address-based partitioning. However, byte addressability requires that some accesses may straddle cache line boundaries, and hence straddle data cache banks. In embodiments, the data cache can be implemented as a split data cache. The split data cache can include portions such as two portions of data cache. The portions of the data cache can each contain substantially similar data or substantially different data. The memory storage locations pointed to by the memory block move addresses can be located in a level of one or both portions of a split cache. In embodiments, the split data cache can be split across two opposite edges of the array of compute elements. The split data cache can enable faster memory access times by reducing data cache access latency. The generating the load address and the store address can be accomplished using various techniques. In embodiments, the generating a load address and a store address can be performed by one or more compute elements within a column of compute elements. The generating the load address and the store address can be in response to obtaining data for processing, storing, or transferring processing results, and the like. The generating the load address and the store address can include generating a pointer, a relative address, an offset address, and the like. In embodiments, the load address and the store address can be generated in the same cycle. The cycle can include an architectural cycle, an array cycle, etc. The addresses can be converted to physical addresses in storage such as the data cache. In embodiments, the generating a load address and a store address can encompass physical address translation of the load target start address and the store target start address, respectively.

The flow 100 includes executing a memory block move 150, based on the memory block move addresses. The memory block move can be within or between memories. In embodiments, the memory block move can include a data cache to data cache transfer. The memory block move can be between levels of a data cache, between portions of a split data cache, and so on. The memory block move can be accomplished using various block move techniques. In the flow 100, data for the memory block move is transferred outside 152 of the array of compute elements. The transferring outside of the array of compute elements enables a block transfer without having to first load the block from storage into the array of compute elements and then having to write the block back out to storage. By transferring outside of the array, significant computational resources such as bus and network resources can be saved, along with significant energy savings. In embodiments, the memory block move that is transferred outside of the array of compute elements can be enabled by the load buffers. The load buffers can hold the store addresses until the load data is returned.

The memory block move can be accomplished using a variety of techniques. In embodiments, the memory block move can be executed as a pseudo-atomic operation. A pseudo-atomic operation can include a sequence of operations that can perform the memory block move. The sequence of operations associated with the block move can be controlled by the pseudo-atomic operations. The sequence of operations can include memory access operations such as load and store operations. In embodiments, the pseudo-atomic operation can provide memory hazard detection and mitigation. The memory hazard detection and mitigation can detect and mitigate memory access hazards such as write-before-read, write-after-read hazards, and so on. A memory block move can be accomplished within an amount of time, a number of cycles, and the like. In embodiments, successful completion of the memory block move can occur within one architectural cycle. Even though the compiler only "sees" one architectural cycle, multiple physical cycles can occur within the array and memory system to accomplish a complex operation in a virtually atomic, or pseudo-atomic, fashion. The one architectural cycle can include an array cycle. In embodiments, the architectural cycle can include a plurality of clock cycles. The clock cycles can include system clock cycles, local clock cycles, etc. To implement a pseudo-atomic memory block move, the array of compute elements (CEs) can serve as an address generation engine. The CEs can use a bunch buffer, as previously mentioned, in which the CEs' bunch buffers in the array are preloaded with operations and can perform small tasks autonomously. After completion, the CEs can signal the control unit that the task is completed.

In embodiments, the memory block move implements a load-to-store forwarding operation. In embodiments, the load-to-store forwarding operation enables the hazard detection and mitigation. Load-to-store forwarding can enable operations such as a write operation and a subsequent read operation, where the write and read operations access the same memory address. The data associated with the write and read operations can be located in buffers such as access buffers or load buffers prior to the data being promoted to storage (e.g., stored into memory). By "forwarding" the write data to the read operation from buffers rather than waiting for the store to occur prior to the load, data access latency can be significantly reduced.

Discussed throughout, memory access operation hazard detection and mitigation can be performed while executing memory block moves as pseudo-atomic operations. Hazard detection and mitigation can be accomplished for other storage accesses as well. Hazard detection and mitigation can enable resolution of memory access addresses that are aliased. Processes, tasks, subtasks, and so on can be executed on the array of compute elements. While some of the tasks, for example, can be executed in parallel, others must be properly sequenced. Execution of the tasks, whether sequentially or in parallel, is dictated in part by any data dependencies between or among tasks. In embodiments, the precedence information enables correct hardware ordering of loads and stores. That is, the loads and stores must occur in the correct order to ensure validity of data that is processed, and by extension, validity of the processing results. In embodiments, the precedence information can provide semantically correct operation ordering. To demonstrate this latter point, consider a usage example in which a task A processes input data and produces output data that is required by task B. Thus, task A must be executed prior to executing task B for correct results. Task C, however, executes tasks that process the same input data as task A and produces its own output data. Thus, task C can be executed in parallel with task A and B. In embodiments, the loads and stores can include memory access loads to the array of compute elements and memory access stores from the array of compute elements.

The execution of tasks can be based on memory access operations, where the memory access operations include data loads from memory, data stores to memory, and so on. If in the example just recited, task B were to attempt to access data before task A had produced the required data, a hazard would occur. Thus, hazard detection and mitigation can be critical to successful parallel processing. In embodiments, the hazards can include write-after-read, read-after-write, and write-after-write conflicts. The hazard mitigation can be accomplished by memory access operation precedence. In some embodiments, hazard mitigation can be enabled by a precedence tag. The control word can generate precedence tags for each access (load and/or store) that leave the array. The tags can then be augmented by the hardware at runtime to deal with loop structures and other complexities that are not fully known at compile time. The precedence tag can support memory access precedence information and can be provided by the compiler at compile time. A precedence tag can be included in the control word, can be associated with the control word, generated by the control word, and so on. The control word can include a number of bits, bytes, etc. In embodiments, the precedence tag can include five bits. The precedence tag can include a fixed length tag, a variable length tag, etc. In other embodiments, hazard detection can be based on identifying memory access operations that access the same address. Precedence information associated with each memory access operation can be used to coordinate memory access operations so that valid data can be loaded, and to ensure that valid data is not corrupted by a store operation overwriting the valid data. Techniques for hazard detection and mitigation can include holding memory access data before promotion, delaying promoting data to the access buffer and/or releasing data from the access buffer, and so on.

A hazardless memory access operation can be executed, where the hazardless memory access operation can be determined by the compiler. The compiler, at compile time, can identify memory access loads and memory access stores that must be executed sequentially, those which can be executed in parallel, and so on. In embodiments, the hazardless memory access can include safe loads from a data cache. A safe load can include data that is unlikely to change, such as a constant value. The safe load can further include coefficient values, weights, biases, and the like. In other embodiments, the safe load can include a read probe. A read probe can be used to determine whether two or more operations are targeting the same address. In embodiments, memory access precedence information provided by the compiler can enable intra-control word precedence. The intra-control word precedence can be used to order two or more operations which can be present in a given control word. In other embodiments, the hazardless memory access can include safe stores to a data cache. The data cache can include a single-level cache, a multilevel cache, and the like. In embodiments, the safe store can include a single compute element operation. The single compute element operation can include a read-modify-write (RMW) operation. In other embodiments, multiple compute elements can cooperatively execute a RMW operation. A compiler-based RMW operation comprises a constructed atomic operation executed across multiple cycles. Because memory access addresses cannot be known at compile time, to guarantee there will be no other accesses that potentially alias into the RMW memory access addresses, the hazard detection and mitigation techniques described herein can enable virtual single cycle RMW behavior across multiple cycles when other memory accesses may be occurring in parallel. In further embodiments, the safe store can include a store probe. The store probe can be used to determine whether operations include memory access operations to the same memory, or storage, address.

In embodiments, a hazardless memory access operation can be designated by a unique set of precedence information contained in a tag. The unique precedence information can include a memory operation number, a return count number, and so on. The order operation numbers associated with operations within a control word can be compared to determine an order of execution. The return count can be used to specify how many cycles, such as compiler cycles, can elapse before the operation must be completed. In embodiments, the unique precedence information contained in the tag can include a unique tag field. The unique tag field can comprise a fixed length or a variable length tag. In embodiments, the unique tag field can support multiple control word memory accesses. The multiple control word memory accesses can include one or more of loads or stores. In embodiments, the unique tag field can indicate safe/unsafe memory access. The safe/unsafe memory access can include access to a constant. In further embodiments, the unique precedence information can include an illegal precedence value. An illegal precedence value can be used to indicate that one or more operations associated with a control word can be terminated, suspended, etc. In embodiments, the unique set of precedence information contained in the tag that was modified during runtime enables inter-control word precedence. The inter-control word precedence can be used to indicate a taken side of a branch instruction.

Memory access operations such as loads can be subject to latency, where the latency can be associated with congestion on a bus, with a transit time associated with a crossbar switch, with latency associated with the storage in which the requested data is located, and so on. The memory access latency can vary by orders of magnitude depending on where the data is located. The memory in which the data can be located can include memory local to the array, a scratch-pad, a cache memory, a memory system, etc. Further, the memory implementation can include memory such as SRAM, DRAM, non-volatile memory, etc., and can directly influence latency.

Discussed in detail below, a change in memory access hazards can result from a change in operation execution sequence. In embodiments, the change of memory access hazards can result from a branch operation decision. Since execution of all sides of a branch can begin prior to a branch decision being made, various memory access operations that are associated with each side of the branch operation can be initiated. When the branch decision is made, then the taken path can proceed, and memory access operations associated with the taken side can likewise proceed. The memory access operations associated with the untaken side or sides are terminated, thereby changing memory access hazards. In other embodiments, the change of memory access hazards can result from a long access data load. The long data access can result from a cache miss, requiring access to a memory system to obtain load data. In embodiments, the long access data load can include a memory access from dynamic random-access memory (DRAM). A load access latency to a DRAM can be longer in comparison to load access of an SRAM because of overhead such as refresh associated with the DRAM. In other embodiments, the long access data load comprises a memory access from non-volatile storage. The non-volatile storage can be implemented using a variety of techniques. In embodiments, the non-volatile storage can include NAND flash storage. Other nonvolatile storage techniques can be based on resistive RAM (ReRAM), spin-transfer torque RAM (STTRAM), etc.

Discussed above and throughout, the operations that are executed can be associated with a task, a subtask, and so on. The operations can include arithmetic, logic, array, matrix, tensor, and other operations. A number of iterations of executing operations can be accomplished based on the contents of the operation counter within a given compute element. The particular operation or operations that are executed in a given cycle can be determined by a set of control word operations. The compute element can be enabled for operation execution, idled for a number of cycles when the compute element is not needed, etc. Recall that the operations that are executed can be repeated. In embodiments, each set of operations associated with one or more control words can enable operational control of a particular compute element for a discrete cycle of operations. An operation can be based on the plurality of control bunches (i.e., sequences of operations) for a given compute element using its autonomous operation buffer(s). The operation that is being executed can include data dependent operations. In embodiments, the plurality of control words includes two or more data dependent branch operations. The branch operation can include two or more branches, where a branch is selected based on an operation such as an arithmetic or logical operation. In a usage example, a branch operation can determine the outcome of an expression such as A>B. If A is greater than B, then one branch can be taken. If A is less than or equal to B, then another branch can be taken. In order to speed execution of a branch operation, sides of the branch can be precomputed prior to datum A and datum B being available. When the data is available, the expression can be computed, and the proper branch direction can be chosen. The untaken branch data and operations can be discarded, flushed, etc. In embodiments, the two or more data dependent branch operations can require a balanced number of execution cycles. The balanced number of execution cycles can reduce or eliminate idle cycles, stalling, and the like. In embodiments, the balanced number of execution cycles is determined by the compiler. In embodiments, the accessing, the providing, the loading, and the executing enable background memory accesses. The background memory access enables a control element to access memory independently of other compute elements, a controller, etc. In embodiments, the background memory accesses can reduce load latency. Load latency is reduced since a compute element can access memory before the compute element exhausts the data that the compute element is processing.

Various steps in the flow 100 may be changed in order, repeated, omitted, or the like without departing from the disclosed concepts. Various embodiments of the flow 100 can be included in a computer program product embodied in a non-transitory computer readable medium that includes code executable by one or more processors.

FIG. 2 is a flow diagram for enabling memory block moves. Discussed previously, memory block moves within a cache such as a data cache are supported by transferring memory block data outside of the array of compute elements. The memory block moves are based on memory block move addresses. The memory block move addresses comprise a load address (e.g., a source) and a store address (e.g., a target). By executing the memory block move as a pseudo-atomic operation, memory hazard detection and mitigation is provided. The memory block moves are enabled by a parallel processing architecture with block move support. The block move support enables task processing. An array of compute elements is accessed, wherein each compute element within the array of compute elements is known to a compiler and is coupled to its neighboring compute elements within the array of compute elements, wherein the array of compute elements is coupled to at least one data cache, wherein the data cache provides memory storage for the array of compute elements. Control for the array of compute elements is provided on a cycle-by-cycle basis, wherein the control is enabled by a stream of wide control words generated by the compiler. A load address and a store address are generated, wherein the load address and the store address comprise memory block move addresses, and wherein the memory block move addresses point to memory storage locations in the at least one data cache. A memory block move is executed, based on the memory block move addresses, wherein data for the memory block move is transferred outside of the array of compute elements.

Memory access operations such as load operations and store operations can originate from one or more compute elements within an array of compute elements. One or more buffers, such as autonomous operation buffers, can be used to control one or more elements, such as compute elements, within an array of elements. Collections, clusters, or groupings of compute elements (CEs), such as CEs assembled within an array of CEs, can be configured using control words. The control words can be decoded (if encoded) and can be used to execute a variety of operations associated with programs, codes, apps, and so on. The operations can be based on tasks and on subtasks that are associated with the tasks. The array can further interface with other elements such as controllers, storage elements, arithmetic logic units (ALUs), memory management units (MMUs), graphics processor units (GPUs), multicycle elements which can perform operations such as multiplication and division, convolvers, neural networks, and the like. The operations can accomplish a variety of task processing objectives such as application processing, data manipulation, design, emulation, simulation, and so on. The operations can perform manipulations of a variety of data types including integer, real, floating point, and character data types; vectors and matrices; tensors; etc. Control is provided to the array of compute elements on a cycle-by-cycle basis, where the control is based on control words generated by a compiler. The control words, which can include microcode control words, enable or idle various compute elements; provide data; route results between or among CEs, caches, and storage; and the like. The control can be based on a stream of control words, where the stream of control words comprises wide, variable length, control words generated by the compiler. Operations contained in one or more control words can be loaded into one or more autonomous operation buffers, where the autonomous operation buffers are integrated within one or more compute elements. The control, which is based on the provided control words, enables compute element operation, memory access precedence, etc. The control words provide operational control of a particular compute element. Compute element operation and memory access precedence enable the hardware to properly sequence compute element results.

Sets of control words, such as the control words provided on a cycle-by-cycle basis, can be stored in buffers. The buffer can be accessible to a controller. The controller uses the control words to configure array elements such as compute elements. The controller further uses the control words to enable execution of a compiled program on the array. The compiled program can be based on tasks, subtasks, etc. The compute elements can access storage elements such as registers, scratchpads, and so on. The storage elements that are accessed by the compute elements contain compressed and decompressed control words, data, intermediate results, results, etc. The caches can include instruction caches and data caches. The caches can include single-level caches, multi-level caches, and so on. The caches can include split caches. The control that is based on the control words is enabled by a parallel processing architecture with block move support. The control enables autonomous compute element operation using buffers.

The compute elements can further include one or more topologies, where a topology can be mapped by the compiler. The topology mapped by the compiler can include a graph such as a directed graph (DG) or directed acyclic graph (DAG), a Petri Net (PN), etc. In embodiments, the compiler maps machine learning functionality to the array of compute elements. The machine learning can be based on supervised, unsupervised, and semi-supervised learning; deep learning (DL); and the like. In embodiments, the machine learning functionality can include a neural network implementation. The compute elements can be coupled to other elements within the array of CEs. In embodiments, the coupling of the compute elements can enable one or more topologies. The other elements to which the CEs can be coupled can include storage elements such as one or more levels of cache storage, multiplier units, address generator units for generating load (LD) and store (ST) addresses, queues, and so on. The compiler to which each compute element is known can include a C, C++, or Python compiler. The compiler to which each compute element is known can include a compiler written especially for the array of compute elements. The coupling of each CE to its neighboring CEs enables sharing of elements such as cache elements, multicycle elements (multiplication, logarithm, square root, etc.), ALU elements, or control elements; communication between or among neighboring CEs; and the like.

The flow 200 includes coupling load buffers 210 located adjacent to at least one edge of the array of compute elements. The load buffers can include two or more buffers associated with the compute element array. The buffers can be shared by the compute elements within the array, a subset of compute elements can be assigned to each buffer, etc. In embodiments, the load buffers can be located adjacent to two opposite edges of the array of compute elements. Each load buffer can be coupled to a column of compute elements. The load buffers can hold data targeted to one or more compute elements within the array or array column. The load buffers can hold data just fetched in a block move operation, as described herein. The load buffers can hold the data as the data is read from a memory such as data cache memory. The load buffers can be used to accumulate an amount of data prior to transferring the data to one or more compute elements, to retime (e.g., hold or delay) delivery of data loaded from storage prior to data transfer to compute elements, and the like. In the flow 200, the memory block move is transferred outside 212 of the array of compute elements. Transferring the memory block outside of the array accomplishes the block transfer without having to load the block into the array only to then store the block back out to memory. In the flow 200, the memory block move that is transferred outside of the array of compute elements is enabled by the load buffers 214. The load buffers can be used to store data, addresses, and so on associated with the memory block move. In the flow 200, the load buffers can provide storage 216 for data obtained from the load address and the dataless store address. Normally, a store operation from a compute element within the array of compute elements would include a store address and data to be stored. Since the memory block move takes place outside the array, there is not array data to be stored, thus there is a dataless store. The data obtained from the load address can be immediately sent back out to the memory along with the store address to initiate completion of the block move operation.

The flow 200 further includes coupling a crossbar switch 220 between the load buffers and the at least one data cache. The crossbar switch can enable access between the load buffers and at least one data cache. If there is no resource contention, the crossbar switch can immediately turn around received load data for storing without having it actually enter the load buffers. While the load buffers can be associated with a subset of compute elements such as columns of compute elements within the array, the data cache can be used to provide data for processing by one or more compute elements, to receive processed data from one or more compute elements, etc. The data cache can receive data from a compute element that can be requested by another data cache. In the flow 200, the crossbar switch can enable memory access anywhere 222 within the at least one data cache. The crossbar switch can connect an array column (and/or a load buffer) to any bank within the associated data cache. The selection of the bank within the associated data cache can be based on the load and/or store address. Enabling memory access anywhere within the data cache can simplify transferring data between compute elements, moving memory blocks within the data cache, etc.

Discussed previously and throughout, the memory block move can be executed as a pseudo-atomic operation, which can be executed as a tight loop orchestrated by a control unit, where CEs in the array perform address computations that can support complex memory stride requirements. The memory block move is accomplished by executing one or more operations associated with a block move, such as a block move within the data cache. The pseudo-atomic operation can be implemented to use existing memory hazard detection and mitigation. Other operations, such as operations executed by compute elements within the array, can alter or change memory access hazards. In embodiments, the change of memory access hazards can result from a branch operation decision. Recall that each side of a branch operation can begin execution prior to a branch decision being determined. Then, when the branch decision is determined, the taken branch can proceed, and any untaken branch paths can be terminated. The termination of untaken branch paths changes memory access hazards by eliminating memory access operations associated with any untaken branches. In other embodiments, the change of memory access hazards can result from a long access data load. In a usage example, an address associated with a data load can first be compared to the contents of a local memory such as cache memory. If the data is not present in the cache, then a cache miss occurs and the data load operation must see the data elsewhere, such as in DRAM-based main memory, which can be located off chip. The long access data load can result from the type of memory used to store the requested data. In embodiments, the long access data load can include a memory access from dynamic random-access memory (DRAM). Since DRAM access can be slower and can require more access overhead (e.g., data refresh) than a static RAM (SRAM), the data load operation can take longer. Thus, one or more tags can be modified to consider the long access data load. In other embodiments, the long access data load can include a memory access from non-volatile storage. The non-volatile storage can include flash memory resistive memory (RcRAM), etc.

A description of a usage example follows. A decoded control word can generate memory access operations. Assuming there can be 64 memory accesses per decompressed control word (DCW) (32 per data cache bank), the minimum precedence information required can be 4 bits per read and per write per column of the data cache, or a total of 8 bytes per data cache bank. It is important to provide a signal to hardware to advise when an access is known and safe and can be ignored. A 5-bit field can be used for each Load or Store access, where the value 00000 can indicate that the Load or Store is "safe". An example of a "safe" address is a very early "probe" read of a column of a level 1 (L1) data cache D$ to "warm" or preload the data cache with data expected to be fetched later. Issuing actual load operations as early as possible can minimize performance impact of memory latency since there can be a significant temporal spread between the issue of a load operation and the decompressed control word that will consume the data (move the data into the array). Hence, precedence tags must continue to be valid across this temporal spread to maintain semantic correctness. Hardware maintains a separate counter, incremented for each successive decompressed control word and appended (upper bits) to the decompressed control word precedence information to provide a unique tag for each access that is valid across multiple decompressed control words.

Various steps in the flow 200 may be changed in order, repeated, omitted, or the like without departing from the disclosed concepts. Various embodiments of the flow 200 can be included in a computer program product embodied in a non-transitory computer readable medium that includes code executable by one or more processors.

Figure 3:
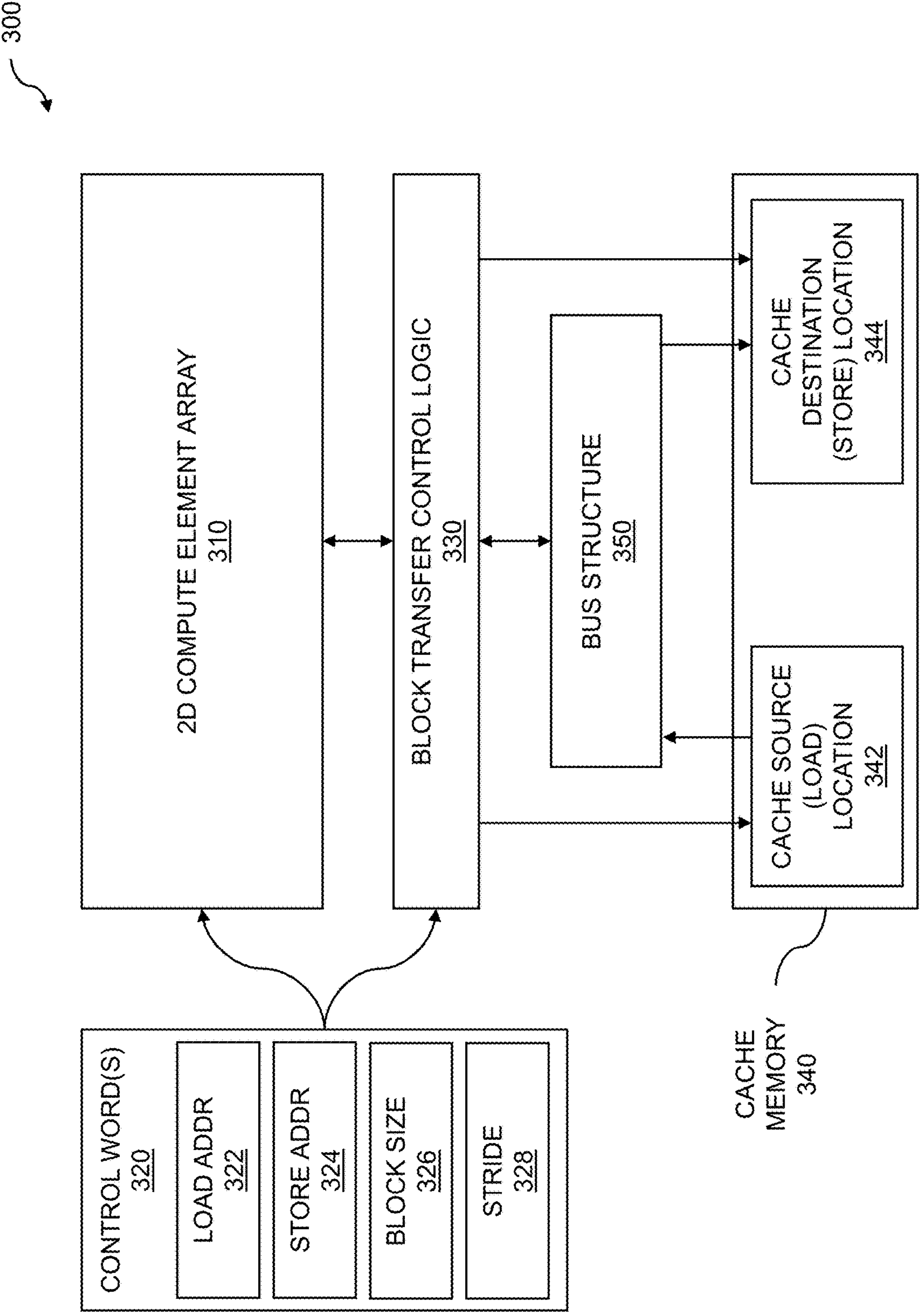
FIG. 3 is a high-level system block diagram for memory block transfer.

FIG. 3 is a high-level system block diagram for memory block transfer. Processes, tasks, subtasks, and so on can be executed on a parallel processing architecture. Some of the tasks, for example, can be executed in parallel, while others must be properly sequenced. The sequential execution and the parallel execution of the tasks are dictated in part by the existence of or absence of data dependencies between tasks. In a usage example, a task A processes input data and produces output data that is required by task B. Thus, task A must be executed prior to executing task B. Task C, however, executes tasks that process the same input data as task A and produces output data. Thus, task C can be executed in parallel with task A. The execution of tasks can be based on memory access operations, where the memory access operations include data loads from memory, data stores to memory, and so on. If, in the example just recited, task B were to attempt to access and process data prior to task A producing the data required by task B, a hazard would occur. Thus, hazard detection and mitigation can be critical to successful parallel processing. In embodiments, the hazards can include write-after-read, read-after-write, and write-after-write conflicts. The hazard detection can be based on identifying memory access operations that access the same address. Precedence information associated with each memory access operation can be used to coordinate memory access operations so that valid data can be loaded, and to ensure that valid data is not corrupted by a store operation overwriting the valid data. Techniques for hazard detection and mitigation can include holding memory access data before promotion, delaying promotion of data to the access buffer and/or releasing data from the access buffer, and so on.

Data movement, whether loading, storing, transferring, etc., can be accomplished using a variety of techniques. In embodiments, memory access operations can be performed outside of the array of compute elements, thereby freeing the compute elements to execute tasks, subtasks, etc. Memory access operations, such as autonomous memory operations, can preload data needed by one or more compute elements. In additional embodiments, a semi-autonomous memory copy technique can be used for transferring data. The semi-autonomous memory copy technique can be accomplished by the array of compute elements which generates source and target addresses required for the one or more data moves. The array can further generate a data size such as 8, 16, 32, or 64-bit data sizes, and a striding value. The striding value can be used to avoid overloading a column of storage components such as a cache memory. The source and target addresses, data size, and striding can be under direct control of a compiler.

A memory block transfer or move can be accomplished between a source location and a destination location. The source location and the destination location can include locations within cache memory. The cache memory can include a data cache memory, where the data cache memory can include one or more levels of cache. The one or more levels of cache memory can include a level 1 (L1) cache, a level 2 (L2) cache, a level 3 (L3) cache, and so on. The memory block move can be performed autonomously from operations executing on a 2D array of compute elements. The memory block transfer is enabled by a parallel processing architecture with block move support. An array of compute elements is accessed, wherein each compute element within the array of compute elements is known to a compiler and is coupled to its neighboring compute elements within the array of compute elements, wherein the array of compute elements is coupled to at least one data cache, wherein the data cache provides memory storage for the array of compute elements. Control for the array of compute elements is provided on a cycle-by-cycle basis, wherein the control is enabled by a stream of wide control words generated by the compiler. A load address and a store address are generated, wherein the load address and the store address comprise memory block move addresses, and wherein the memory block move addresses point to memory storage locations in the at least one data cache. A memory block move is executed, based on the memory block move addresses, wherein data for the memory block move is transferred outside of the array of compute elements.

The system block diagram 300 can include a 2D array of compute elements 310. Discussed throughout, the compute elements within the 2D array can be implemented using techniques such as central processing units (CPUs), graphics processing units (GPUs), application specific integrated circuits (ASICs), field programmable gate arrays (FPGAs), processor cores, or other processing components or combinations of processing components. The compute elements can further include heterogeneous processors, homogeneous processors, processor cores within an integrated circuit or chip, etc. The 2D array can further interface with other elements such as controllers, storage elements, ALUs, memory management units (MMUs), GPUs, multicycle elements, and so on.

The system block diagram can include one or more control words 320. The one or more control words can be generated by the compiler. Noted previously, the compiler which generates the control words can include a general-purpose compiler such as a C, C++, or Python compiler; a hardware description language compiler such as a VHDL or Verilog compiler; a compiler written for the array of compute elements; and the like. In embodiments, the wide control words comprise wide, variable length control words. The compiler can be used to map functionality such as processing functionality to the array of compute elements. A control word generated by the compiler can be used to configure one or more CEs within the 2D array of compute elements, to enable data to flow to or from the CE, to configure the CE to perform an operation, and so on. Depending on the type and size of a task that is compiled to control the array of compute elements, one or more of the CEs can be controlled, while other CEs are unneeded by the particular task. The control words can configure the compute elements and other elements within the array; enable or disable individual compute elements or rows and/or columns of compute elements; load and store data; route data to, from, and among compute elements; etc.

The one or more wide control words can include one or more fields. The fields can include parameters associated with one or more memory block transfers. The block transfers can include block transfers associated with cache memory. A control word can include a source or load address 322. The load address can be a load starting address. The load address can include an address within a cache memory, a memory system, and so on. The cache memory can include a data cache. In embodiments, the data cache can be located adjacent to at least one edge of the array of compute elements. The cache memory can comprise a multilevel cache, where the multilevel cache can include a level 1 (L1) cache, a level 2 (L2) cache, and a level 3 (L3) cache. The control word can further include a target or store address 324. The store address can be a store starting address. The store address can include an address within a cache, a memory system, etc. The target address can be within the same cache as the source address or a different cache. A cache-to-cache transfer can be accomplished autonomously and independently from the 2D array of compute elements. The control word can include a block size 326. The block size can be based on a number of bits, bytes, words, etc. The block size can be based on a block of cache lines. The control word can include a stride 328. A stride can include an increment or step size in memory units such as bytes between the beginnings of successive data elements such as words, cache lines, etc.

The system block diagram can include block transfer control logic 330. The block transfer control logic can control transfer memory blocks within a cache memory, between cache memories, between a cache memory and a memory system, and so on. In embodiments, the memory block transfer control logic can compute memory addresses. The memory addresses can include a load address and a store address. The load address and the store address can comprise memory block move addresses. The memory addresses that can be computed can include absolute or direct addresses, indirect addresses, relative addresses, and so on. The memory addresses, such as a cache source location and a cache destination location, can be provided by the block transfer control logic. In other embodiments, the generating a load address and a store address can be performed by one or more compute elements within a column of compute elements. The memory addresses can comprise hybrid addresses. Discussed previously and throughout, the memory block transfer control logic can be implemented outside of the 2D array of compute elements (as shown). The memory block transfer control logic can be operated using a "fire and forget" technique, where a control word is provided to the control logic. In embodiments, the memory block transfer control logic can operate autonomously from the 2D array of compute elements. The memory block transfer control logic function can be based on elements of the 2D array of compute elements. In embodiments, the memory block transfer control logic can be augmented by configuring one or more compute elements from the 2D array of compute elements. The configuring the one or more compute elements can include scheduling compute elements. In embodiments, the configuring initializes compute element operation buffers within the one or more compute elements. The buffers can be used for data, control words, groupings of control words, and the like. In embodiments, the operation buffers comprise bunch buffers. The bunch buffers can store bunches of control words, bunches of bits associated with control words, etc.

The system block diagram can include a cache memory element 340. The cache memory element can comprise multiple levels of cache, where each level of cache can be the same size as or larger than the previous level. The level can be as fast as or slower than the previous cache level. The cache levels can include a level 1 (L1) cache, a level 2 (L2) cache, and a level 3 (L3) cache. A memory block transfer operation will first seek a memory block to be transferred in the L1 cache. If the memory block is not in the L1 cache, then a "miss" occurs, and the memory block is sought in the L2 cache. If a miss occurs in the L2 cache, then the L3 cache is tried. If the memory block for transfer is not in the L3 cache, then a miss again occurs, and the memory block is sought in a memory system. A memory block transfer moves a memory block from a source location such as a cache source (load) location 342 to a cache destination (store) location 344. The memory block transfer can be based on a cache line move. The transfer can be performed using one or more of communication channels, buses, networks, etc. The system block diagram can include a bus structure 350. The bus structure can include an on-chip bus such as a ring bus, a network, and so on. In embodiments, the network can include a network-on-chip (NoC). The bus structure can include a transfer bus. In embodiments, the cache line move can transfer data on a unidirectional line transfer bus.

Discussed previously and throughout, the memory block transfer can be executed as a pseudo-atomic operation, where the pseudo-atomic operation can control the execution of memory access operations. The memory access operations can include access operations to a cache such as a data cache. The pseudo-atomic operation can provide memory hazard detection and mitigation. The memory hazard detection and mitigation can detect and mitigate hazards such as write-before-read hazards, write-after-read hazards, and so on. A memory block move can include moving a block such as a block of cache lines within a memory such as a cache memory. The cache memory can include a data cache memory. Data can be loaded from a memory such as a cache memory into the compute elements for processing, and results of the processing can be stored back to memory. Since the array of compute elements can be configured for parallel processing applications, the order in which the data loads and the data stores are executed is critical. The data to be loaded must be valid, and the data that is stored must not overwrite valid data yet to be loaded for processing. Loading invalid data or storing data over valid data are considered memory access hazards.

FIG. 4 illustrates a system block diagram for a highly parallel architecture with a shallow pipeline. The highly parallel architecture can comprise components including compute elements; processing elements; buffers; one or more levels of cache storage; system management; arithmetic logic units; multicycle elements for computing multiplication, division, and square root operations; and so on. The various components can be used to accomplish parallel processing of tasks, subtasks, and the like. The parallel processing is associated with program execution, job processing, etc. The parallel processing accomplishes task processing. The task processing is enabled using a parallel processing architecture with block move support. An array of compute elements is accessed, wherein each compute element within the array of compute elements is known to a compiler and is coupled to its neighboring compute elements within the array of compute elements, wherein the array of compute elements is coupled to at least one data cache, wherein the data cache provides memory storage for the array of compute elements. Control for the array of compute elements is provided on a cycle-by-cycle basis, wherein the control is enabled by a stream of wide control words generated by the compiler. A load address and a store address are generated, wherein the load address and the store address comprise memory block move addresses, and wherein the memory block move addresses point to memory storage locations in the at least one data cache. A memory block move is executed, based on the memory block move addresses, wherein data for the memory block move is transferred outside of the array of compute elements.

A system block diagram 400 for a highly parallel architecture with a shallow pipeline is shown. The system block diagram can include a compute element array 410. The compute element array 410 can be based on compute elements, where the compute elements can include processors, central processing units (CPUs), graphics processing units (GPUs), coprocessors, and so on. The compute elements can be based on processing cores configured within chips such as application specific integrated circuits (ASICs), processing cores programmed into programmable chips such as field programmable gate arrays (FPGAs), and so on. The compute elements can comprise a homogeneous array of compute elements. The system block diagram 400 can include translation and look-aside buffers such as translation and look-aside buffers 412 and 438. The translation and look-aside buffers can comprise memory caches, where the memory caches can be used to reduce storage access times.

The system block diagram 400 can include logic for load and store access order and selection. The logic for load and store access order and selection can include crossbar switch and logic 415 along with crossbar switch and logic 442. Crossbar switch and logic 415 can accomplish load and store access order and selection for the lower data cache blocks (418 and 420), and crossbar switch and logic 442 can accomplish load and store access order and selection for the upper data cache blocks (444 and 446). Crossbar switch and logic 415 enables high-speed data communication between the lower-half compute elements of compute element array 410 and data caches 418 and 420 using access buffers 416. Crossbar switch and logic 442 enables high-speed data communication between the upper-half compute elements of compute element array 410 and data caches 444 and 446 using access buffers 443. The access buffers 416 and 443 allow logic 415 and logic 442, respectively, to hold, load, or store data until any memory hazards are resolved. In addition, splitting the data cache between physically adjacent regions of the compute element array can enable the doubling of load access bandwidth, the reducing of interconnect complexity, and so on. While loads can be split, stores can be driven to both lower data caches 418 and 420 and upper data caches 444 and 446.

The system block diagram 400 can include lower load buffers 414 and upper load buffers 441. The load buffers can provide temporary storage for memory load data so that it is ready for low latency access by the compute element array 410. The system block diagram can include dual level 1 (L1) data caches, such as L1 data caches 418 and 444. The L1 data caches can be used to hold blocks of load and/or store data, such as data to be processed together, data to be processed sequentially, and so on. The L1 cache can include a small, fast memory that is quickly accessible by the compute elements and other components. The system block diagram can include level 2 (L2) data caches. The L2 caches can include L2 caches 420 and 446. The L2 caches can include larger, slower storage in comparison to the L1 caches. The L2 caches can store "next up" data, results such as intermediate results, and so on. The L1 and L2 caches can further be coupled to level 3 (L3) caches. The L3 caches can include L3 caches 422 and 448. The L3 caches can be larger than the L2 and L1 caches and can include slower storage. Accessing data from L3 caches is still faster than accessing main storage. In embodiments, the L1, L2, and L3 caches can include 4-way set associative caches.

The system block diagram 400 can include lower multicycle element 413 and upper multicycle element 440. The multicycle elements (MEMs) can provide efficient functionality for operations that span multiple cycles, such as multiplication operations. The MEMs can provide further functionality for operations that can be of indeterminant cycle length, such as some division operations, square root operations, and the like. The MEMs can operate on data coming out of the compute element array and/or data moving into the compute element array. Multicycle element 413 can be coupled to the compute element array 410 and load buffers 414, and multicycle element 440 can be coupled to compute element array 410 and load buffers 441.

The system block diagram 400 can include a system management buffer 424. The system management buffer can be used to store system management codes or control words that can be used to control the array 410 of compute elements. The system management buffer can be employed for holding opcodes, codes, routines, functions, etc. which can be used for exception or error handling, management of the parallel architecture for processing tasks, and so on. The system management buffer can be coupled to a decompressor 426. The decompressor can be used to decompress system management compressed control words (CCWs) from system management compressed control word buffer 428 and can store the decompressed system management control words in the system management buffer 424. The compressed system management control words can require less storage than the uncompressed control words. The system management CCW component 428 can also include a spill buffer. The spill buffer can comprise a large static random-access memory (SRAM), which can be used to provide rapid support of multiple nested levels of exceptions.

The compute elements within the array of compute elements can be controlled by a control unit such as control unit 430. While the compiler, through the control word, controls the individual elements, the control unit can pause the array to ensure that new control words are not driven into the array. The control unit can receive a decompressed control word from a decompressor 432 and can drive out the decompressed control word into the appropriate compute elements of compute element array 410. The decompressor can decompress a control word (discussed below) to enable or idle rows or columns of compute elements, to enable or idle individual compute elements, to transmit control words to individual compute elements, etc. The decompressor can be coupled to a compressed control word store such as compressed control word cache 1 (CCWC1) 434. CCWC1 can include a cache such as an L1 cache that includes one or more compressed control words. CCWC1 can be coupled to a further compressed control word store such as compressed control word cache 2 (CCWC2) 436. CCWC2 can be used as an L2 cache for compressed control words. CCWC2 can be larger and slower than CCWC1. In embodiments, CCWC1 and CCWC2 can include 4-way set associativity. In embodiments, the CCWC1 cache can contain decompressed control words, in which case it could be designated as DCWC1. In that case, decompressor 432 can be coupled between CCWC1 434 (now DCWC1) and CCWC2 436.

FIG. 5 shows compute element array detail 500. A compute element array can be coupled to components which enable one or more compute elements within the array to process one or more tasks, subtasks, processes, and so on. The tasks, subtasks, etc. can be processed in parallel. The components can access and provide data, perform specific high-speed operations such as arithmetic and logic operations, and the like. The compute element array and its associated components enable a parallel processing architecture with block move support. The compute element array 510 can perform a variety of processing tasks, where the processing tasks can include operations such as arithmetic, vector, matrix, or tensor operations; audio and video processing operations; neural network operations; etc. The compute elements can be coupled to multicycle elements such as lower multicycle elements 512 and upper multicycle elements 514. The multicycle elements can provide functionality to perform, for example, high-speed multiplications associated with general processing tasks, multiplications associated with neural networks such as deep learning networks, multiplications associated with vector operations, and the like. The multiplication operations can span multiple cycles. The MEMs can provide further functionality for operations that can be of indeterminant cycle length, such as some division operations, square root operations, and the like.

The compute elements can be coupled to load buffers such as load buffers 516 and load buffers 518. The load buffers can be coupled to the L1 data caches as discussed previously. In embodiments, a crossbar switch (not shown) can be coupled between the load buffers and the data caches. The load buffers can be used to load storage access requests from the compute elements. When an element is not explicitly controlled, it can be placed in the idle (or low power) state. No operation is performed, but ring buses can continue to operate in a "pass thru" mode to allow the rest of the array to operate properly. When a compute element is used just to route data unchanged through its ALU, it is still considered active.

While the array of compute elements is paused, background loading of the array from the memories (data memory and control word memory) can be performed. The memory systems can be free running and can continue to operate while the array is paused. Because multicycle latency can occur due to control signal transport that results in additional "dead time", allowing the memory system to "reach into" the array and to deliver load data to appropriate scratchpad memories can be beneficial while the array is paused. This mechanism can operate such that the array state is known, as far as the compiler is concerned. When array operation resumes after a pause, new load data will have arrived at a scratchpad, as required for the compiler to maintain the statically scheduled model.

Figure 6:
FIG. 6 illustrates memory to memory data movement array detail.

FIG. 6 illustrates memory to memory data movement array detail. Discussed previously and throughout, a compute element array can be coupled to components beyond the array. The components beyond the array enable one or more compute elements within the array to process one or more processes, tasks, subtasks, and so on. Operations associated with the tasks, subtasks, etc. can be processed in parallel. The components to which the array is coupled can access and provide data, perform specific high-speed operations such as arithmetic and logic operations, and the like. The compute element array and its associated components enable a parallel processing architecture with block move support. An array of compute elements is accessed, wherein each compute element within the array of compute elements is known to a compiler and is coupled to its neighboring compute elements within the array of compute elements, wherein the array of compute elements is coupled to at least one data cache, wherein the data cache provides memory storage for the array of compute elements. Control is provided for the array of compute elements on a cycle-by-cycle basis, wherein the control is enabled by a stream of wide control words generated by the compiler. A load address and a store address are generated, wherein the load address and the store address comprise memory block move addresses, and wherein the memory block move addresses point to memory storage locations in the at least one data cache. A memory block move is executed, based on the memory block move addresses, wherein data for the memory block move is transferred outside of the array of compute elements.

Memory to memory data movement array detail is illustrated 600. A compute element array 610 can perform a variety of processing tasks. The task processing can be based on operations associated with the tasks, where the operations can include arithmetic, vector, matrix, or tensor operations; logic operations; audio and video processing operations; neural network operations; and so on. Discussed previously, the compute elements can be coupled to one or more multicycle elements (not shown). The multicycle elements can provide functionality to perform operations such as multiplication associated with a variety of processing tasks. The multiplication operations can span multiple cycles such as array cycles. The MEMs can provide further functionality for operations that can be of indeterminant cycle length, such as some division operations, square root operations, etc. The compute elements can be coupled to load buffers such as load buffers 612. Embodiments include coupling load buffers located adjacent to at least one edge of the array of compute elements. The load buffers can be accessible to groupings of compute elements such as to columns of compute elements within the array. The load buffers can be coupled to memory block transfer control logic 614. The memory block transfer control logic can obtain generated memory block move addresses, where the memory block move addresses can include a load address and a store address. The load address and the store address can be generated by a compute element within the array. In embodiments, the memory block move can be executed as a pseudo-atomic operation. An atomic operation can comprise a sequence of operations such as memory access operations. The sequence of the memory access operations can be controlled by the pseudo-atomic operation. In embodiments, the pseudo-atomic operation can provide memory hazard detection and mitigation.

The load buffers can be used to load storage access requests from the compute elements. When an element is not explicitly controlled, it can be placed in the idle (or low power) state. No operation is performed, but ring buses can continue to operate in a "pass thru" mode to allow the rest of the array to operate properly. When a compute element is used just to route data unchanged through its ALU, it is still considered active. The load requests from the compute elements can target storage addresses. The targeted storage addresses can be present in cache storage such as a data cache. In embodiments, a crossbar switch 616 can be coupled between the load buffers and at the least one data cache. The crossbar switch can enable access between the load buffers and at least one data cache. While the load buffers can be associated with a subset of compute elements such as columns of compute elements within the array, the data cache can be used to provide data for processing by a compute element, to receive processed data from compute elements, and so on. The data cache can receive data from a compute element that can be requested by another data cache. In embodiments, the crossbar switch can enable memory access anywhere within the at least one data cache. Enabling memory access anywhere with the data cache can simplify transferring data between compute elements, within the data cache, etc.

The crossbar switch can be coupled to access buffers 618. The access buffers can be used to hold data prior to promotion to storage such as a data cache, a shared memory system, and so on. Promoting data to storage can include writing the data to the storage. Data can be held prior to promotion. The holding can include holding data prior to promotion to the access buffers, holding data in the access buffers prior to promotion to storage such as cache storage, and the like. The holding and promoting or releasing data can be controlled by memory access hazard detection and mitigation techniques. The access buffers can be coupled to at least one data cache via line transfer buses 620. The line transfer buses can transfer a line such as a cache line between the access buffers and a cache such as a data cache. The line transfer buses can include an interconnect, a network associated with or coupled to the array of compute elements, and so on. The network can include a network-on-chip element. The line transfer buses can be coupled to at least one data cache. The at least one data cache can include a single-level cache, a multi-level cache, and so on. In embodiments, the data cache can include a level 1 (L1) data cache 622, a level 2 (L2) data cache 624, a level 3 (L3) data cache 626, and so on. In embodiments, the L3 cache can include a unified L3 cache. The unified L3 cache can be shared by more than one L2 cache, where each L2 cache can be associated with compute element array.

While the compute element array is shown to be coupled on one edge of the array to the load buffers 612, the memory block transfer control logic 614, the crossbar switch 616, the access buffers 618, the line transfer buses 620, the L1 data cache 622, the L2 data cache 624, and the unified L3 data cache are substantially similar components which can be coupled to one or more other edges of the compute element array. In embodiments, the load buffers can be located adjacent to two opposite edges of the array of compute elements. Locating load buffers on two opposite edges of the array can enable more efficient access to the load buffers by the compute elements due to reduced propagation delays through the array. Data caches can be coupled to the load buffers on the two opposite sides of the array. The data caches can include two separate data caches, duplicate data caches, and so on. In embodiments, the data cache can be implemented as a split data cache. The split data cache can include instructions, data, and so on. In embodiments, instructions can be stored in one portion of the split data cache, and data can be stored in another portion of the data cache. In embodiments the split data cache can be split across two opposite edges of the array of compute elements.

Figure 7:
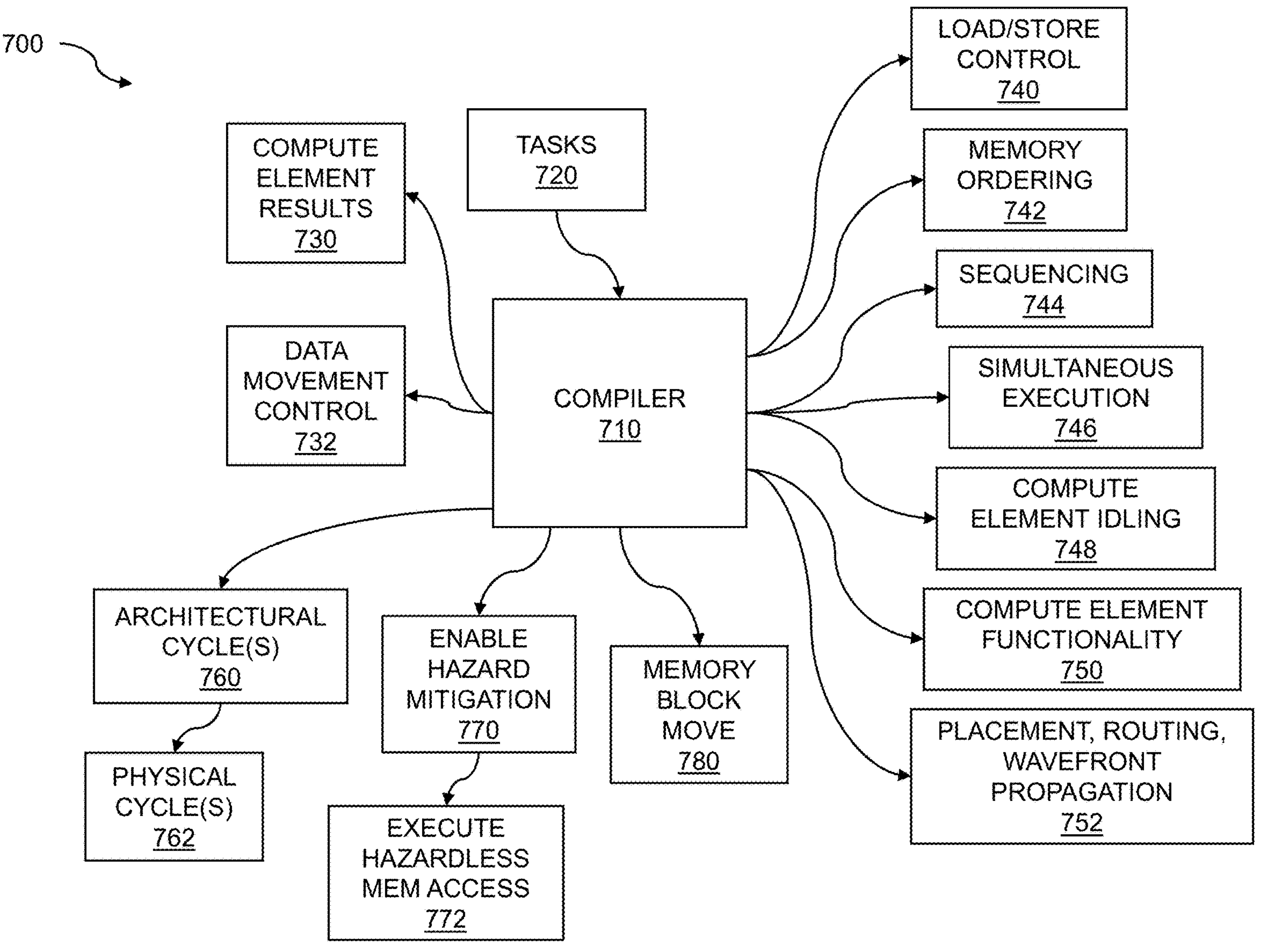
FIG. 7 shows a system block diagram for compiler interactions.

FIG. 7 illustrates a system block diagram for compiler interactions. Discussed throughout, compute elements within a 2D array are known to a compiler which can compile tasks, subtasks, processes, and so on for execution on the array. The compiled tasks and subtasks are executed to accomplish task processing. A variety of interactions, such as configuration of compute elements, placement of tasks, routing of data, and so on, can be associated with the compiler. The compiler interactions enable a parallel processing architecture with block move support. An array of compute elements is accessed, wherein each compute element within the array of compute elements is known to a compiler and is coupled to its neighboring compute elements within the array of compute elements, wherein the array of compute elements is coupled to at least one data cache, wherein the data cache provides memory storage for the array of compute elements. Control is provided for the array of compute elements on a cycle-by-cycle basis, wherein the control is enabled by a stream of wide control words generated by the compiler. A load address and a store address are generated, wherein the load address and the store address comprise memory block move addresses, and wherein the memory block move addresses point to memory storage locations in the at least one data cache. A memory block move is executed, based on the memory block move addresses, wherein data for the memory block move is transferred outside of the array of compute elements.

The system block diagram 700 includes a compiler 710. The compiler can include a high-level compiler such as a C, C++, Python, or similar compiler. The compiler can include a compiler implemented for a hardware description language such as a VHDL™ or Verilog™ compiler. The compiler can include a compiler for a portable, language-independent, intermediate representation such as low-level virtual machine (LLVM) intermediate representation (IR). The compiler can generate a set of directions that can be provided to the compute elements and other elements within the array. The compiler can be used to compile tasks 720. The tasks can include a plurality of tasks associated with a processing task. The tasks can further include a plurality of subtasks. The tasks or subtasks can be based on an application such as a video processing or audio processing application. In embodiments, the tasks can be associated with machine learning functionality. The compiler can generate directions for handling compute element results 730. The compute element results can include results derived from arithmetic, vector, array, and matrix operations; Boolean operations; and so on. In embodiments, the compute element results are generated in parallel in the array of compute elements. Parallel results can be generated by compute elements when the compute elements can share input data, use independent data, and the like. The compiler can generate a set of directions that controls data movement 732 for the array of compute elements. The control of data movement can include movement of data to, from, and among compute elements within the array of compute elements. The control of data movement can include loading and storing data, such as temporary data storage, during data movement. In other embodiments, the data movement can include intra-array data movement. Data movement can further be accomplished outside of the array of compute elements. In embodiments, data movement comprises a memory block move. The memory block move can be based on memory block move addresses (e.g., load address and store address). In embodiments, data for the memory block move can be transferred outside of the array of compute elements.

As with a general-purpose compiler used for generating tasks and subtasks for execution on one or more processors, the compiler can provide directions for task and subtasks handling, input data handling, intermediate and final result data handling, and so on. The compiler can further generate directions for configuring the compute elements, storage elements, control units, ALUs, and so on, associated with the array. As previously discussed, the compiler generates directions for data handling to support the task handling. In the system block diagram, the data movement can include control of data loads and stores 740 with a memory array. The loads and stores can include handling various data types such as integer, real or float, double-precision, character, and other data types. The loads and stores can load and store data into local storage such as registers, register files, caches, and the like. The caches can include one or more levels of cache such as a level 1 (L1) cache, level 2 (L2) cache, level 3 (L3) cache, and so on. The loads and stores can also be associated with storage such as shared memory, distributed memory, etc. In addition to the loads and stores, the compiler can handle other memory and storage management operations including memory precedence. In the system block diagram, the memory access precedence can enable ordering of memory data 742. Memory data can be ordered based on task data requirements, subtask data requirements, task priority or precedence, and so on. The memory data ordering can enable parallel execution of tasks and subtasks.

In the system block diagram 700, the ordering of memory data can enable compute element result sequencing 744. In order for task processing to be accomplished successfully, tasks and subtasks must be executed in an order that can accommodate task priority, task precedence, a schedule of operations, and so on. The memory data can be ordered such that the data required by the tasks and subtasks can be available for processing when the tasks and subtasks are scheduled to be executed. The results of the processing of the data by the tasks and subtasks can therefore be ordered to optimize task execution, to reduce or eliminate memory contention conflicts, etc. The system block diagram includes enabling simultaneous execution 746 of two or more potential compiled task outcomes based on the set of directions. The code that is compiled by the compiler can include branch points, where the branch points can include computations or flow control. Flow control transfers program execution to a different sequence of control words. Since the result of a branch decision, for example, is not known a priori, the initial operations associated with both paths are encoded in the currently executing control word stream. When the correct result of the branch is determined, the sequence of control words associated with the correct branch result continues execution, while the operations for the branch path not taken are halted and side effects may be flushed. In embodiments, the two or more potential branch paths can be executed on spatially separate compute elements within the array of compute elements.

The system block diagram includes compute element idling 748. In embodiments, the set of directions from the compiler can idle an unneeded compute element within a row of compute elements located in the array of compute elements. Not all of the compute elements may be needed for processing, depending on the tasks, subtasks, and so on that are being processed. The compute elements may not be needed simply because there are fewer tasks to execute than there are compute elements available within the array. In embodiments, the idling can be controlled by a single bit in the control word generated by the compiler. In the system block diagram, compute elements within the array can be configured for various compute element functionalities 750. The compute element functionality can enable various types of computation architectures, processing configurations, and the like. In embodiments, the set of directions can enable machine learning functionality. The machine learning functionality can be trained to process various types of data such as image data, audio data, medical data, etc. In embodiments, the machine learning functionality can include neural network implementation. The neural network can include a convolutional neural network, a recurrent neural network, a deep learning network, and the like. The system block diagram can include compute element placement, results routing, and computation wave-front propagation 752 within the array of compute elements. The compiler can generate directions or instructions that can place tasks and subtasks on compute elements within the array. The placement can include placing tasks and subtasks based on data dependencies between or among the tasks or subtasks, placing tasks that avoid memory conflicts or communications conflicts, etc. The directions can also enable computation wave-front propagation. Computation wave-front propagation can implement and control how execution of tasks and subtasks proceeds through the array of compute elements.

In the system block diagram, the compiler can control architectural cycles 760. An architectural cycle can include an abstract cycle that is associated with the elements within the array of elements. The elements of the array can include compute elements, storage elements, control elements, ALUs, and so on. An architectural cycle can include an "abstract" cycle, where an abstract cycle can refer to a variety of architecture level operations such as a load cycle, an execute cycle, a write cycle, and so on. The architectural cycles can refer to macro-operations of the architecture rather than to low level operations. One or more architectural cycles are controlled by the compiler. Execution of an architectural cycle can be dependent on two or more conditions. Architectural cycles are under direct control of the compiler, as opposed to wall clock cycles which can encompass the indeterminacies of memory operation. In embodiments, an architectural cycle can occur when a control word is available to be driven into the array of compute elements and when all data dependencies are met. That is, the array of compute elements does not have to wait for either dependent data to load or for a full memory queue to clear or drain. In the system block diagram, the architectural cycle can include one or more physical cycles 762. A physical cycle can refer to one or more cycles at the element level that are required to implement a load, an execute, a write, and so on. In embodiments, the set of directions can control the array of compute elements on a physical cycle-by-cycle basis. The physical cycles can be based on a clock such as a local, module, or system clock, or some other timing or synchronizing technique. In embodiments, the physical cycle-by-cycle basis can include an architectural cycle. The physical cycles can be based on an enable signal for each element of the array of elements, while the architectural cycle can be based on a global, architectural signal. In embodiments, the compiler can provide, via the control word, valid bits for each column of the array of compute elements, on the cycle-by-cycle basis. A valid bit can indicate that data is valid and ready for processing, that an address such as a jump address is valid, and the like. In embodiments, the valid bits can indicate that a valid memory load access is emerging from the array. The valid memory load access from the array can be used to access data within a memory or storage element. Similarly, a returning load can be tagged with a valid bit as part of a background load protocol to enable that data to be written into a compute element's memory outside of direct compiler control. In other embodiments, the compiler can provide, via the control word, operand size information for each column of the array of compute elements. Various operand sizes can be used. In embodiments, the operand size can include bytes, half-words, words, and double-words.

Discussed above and throughout, memory access operation hazards can be mitigated. One technique that can enable hazard mitigation is to use a precedence tag. The precedence tag can include a fixed length tag, a variable length tag, and so on. The precedence tag can be used to order operations, load or store data, enable early issuing of load and store operations, preload data, and the like. In embodiments, the precedence tag can support memory access precedence information. The memory access precedence information can be used to provide an order in which memory access load and store operations are to be executed. In embodiments, the precedence information can provide semantically correct operation ordering. The correct operation ordering can be based on task or subtask precedence or priority, an order of operations such as arithmetic operations (e.g., multiplication, division, addition, and subtraction or MDAS). In embodiments, the precedence tag is generated by the compiler at compile time. In the context of data block moves, the memory block move can include a data cache to data cache transfer. In embodiments, a data block move can be executed as a pseudo-atomic operation. An atomic operation can include one or more operations. The atomic operation can include a sequence of operations such as operations accessing the data cache. The sequence of operations can comprise the memory block move. Since the atomic operation dictates the sequence of operations, the operation can provide memory hazard detection and mitigation.

The system block diagram 700 includes enabling memory access hazard mitigation 770. The hazards of memory access operations can be mitigated by ordering load and store operations. The ordering can be accomplished by assigning priorities to load and store operations, indicating a precedence to operations, executing load-to-store forwarding, and so on. The system block diagram includes hazardless memory access execution 772. The hazardless memory access operation can include accessing a cache such as a data cache, a memory system, and so on. In embodiments, the hazardless memory access operation can be determined by the compiler. The compiler determines the hazardless memory access operation at compile time. In embodiments, the hazardless memory access operation can be designated by a unique set of precedence information contained in a tag. The precedence information can include a memory operation number, where the memory operation number can include a semantic order, a tag, and so on. The precedence information can further include a return count. The return count can include a number of compiler cycles that can elapse prior to load data uptake by the array.

Hazard detection and mitigation can be accomplished for memory block moves. The system block diagram includes memory block move 780. The memory block transfer or move can be based on memory block move addresses, wherein data for the memory block move can be transferred outside of the array of compute elements. Recall that the memory block move addresses can include a generated load address and generated store address. The load address and the store address can point to memory storage locations in the at least one data cache. When the data associated with the memory block move is not found in the data cache, the load address or the store address can be located in other storage such as a shared memory system. In embodiments, the generating a load address and a store address can encompass physical address translation of the load target start address and the store target start address, respectively. The generating of the load address and the store address can be accomplished by a compute element within the array of compute elements. The compute element can generate the load and store addresses based on one or more memory access operations. Discussed previously, the memory block transfer can be executed as a pseudo-atomic operation, which can provide memory hazard detection and mitigation.

Since the compiler cannot know a priori all possible causes of bus, crossbar switch, cache memory access, memory system access, etc. latencies at compile time, the contents of the tag can be modified to reflect the state of the array while executing tasks, subtasks, and so on. Embodiments further include modifying the tag during runtime. The modifying can accommodate bus, crossbar switch, and memory latencies that can occur during run time. In embodiments, the modifying can be performed by hardware. The hardware can include a compute element, a modifying element within the array, a modifying element associated with the array, etc. The need to modify the tag can result from execution of an operation. In embodiments, the hardware modifying is based on a change of memory access hazards. An example of when such a change can occur is a branch decision. The branch decision determines which side of the branch to take, and which side or sides not to take. As a result, any memory access operations initiated by operations associated with the untaken side or side are terminated, thereby changing memory access hazards. Memory access operations to various types of memories can also change memory access hazards. In embodiments, the change of memory access hazards can result from a long access data load. A long access data load can result from accessing a memory such as a DRAM, a non-volatile memory, and so on.

FIG. 8 is a system diagram for task processing. The task processing is enabled by a parallel processing architecture with block move support. The system 800 can include one or more processors 810, which are coupled to a memory 812 which stores instructions. The system 800 can further include a display 814 coupled to the one or more processors 810 for displaying data; intermediate steps; directions; control words; precedence tags; control word bunches; compressed control words; control words implementing Very Long Instruction Word (VLIW) functionality; topologies including systolic, vector, cyclic, spatial, streaming, or VLIW topologies; and so on. In embodiments, one or more processors 810 are coupled to the memory 812, wherein the one or more processors, when executing the instructions which are stored, are configured to: access an array of compute elements, wherein each compute element within the array of compute elements is known to a compiler and is coupled to its neighboring compute elements within the array of compute elements, wherein the array of compute elements is coupled to at least one data cache, wherein the data cache provides memory storage for the array of compute elements; provide control for the array of compute elements on a cycle-by-cycle basis, wherein the control is enabled by a stream of wide control words generated by the compiler; generate a load address and a store address, wherein the load address and the store address comprise memory block move addresses, and wherein the memory block move addresses point to memory storage locations in the at least one data cache; and execute a memory block move, based on the memory block move addresses, wherein data for the memory block move is transferred outside of the array of compute elements. The compute elements can include compute elements within one or more integrated circuits or chips; compute elements or cores configured within one or more programmable chips such as application specific integrated circuits (ASICs); field programmable gate arrays (FPGAs); heterogeneous processors configured as a mesh; standalone processors; etc.

The system 800 can include a cache 820. The cache 820 can be used to store data such as scratchpad data, operations that support a balanced number of execution cycles for a data dependent branch; directions to compute elements, control words, precedence tags, and control word bunches comprising control word bits; load address and store addresses associated with block move addresses; intermediate results; microcode; branch decisions; and so on. The cache can comprise a small, local, easily accessible memory available to one or more compute elements. In embodiments, the data that is stored can include operations, additional operations, and so on, where the operations and additional operations are contained in one or more control words and can be loaded into one or more autonomous operation buffers. The operations, additional operations, and the like can enable autonomous compute element operations using buffers. The data within the cache can include data required to support dataflow processing by statically scheduled compute elements within the 2D array of compute elements. The cache can be accessed by one or more compute elements. The cache, if present, can include a dual read, single write (2R1 W) cache. That is, the 2R1 W cache can enable two read operations and one write operation contemporaneously without the read and write operations interfering with one another.

The system 800 can include an accessing component 830. The accessing component 830 can include control logic and functions for accessing an array of compute elements. The array of compute elements can include a two-dimensional (2D) array or a three-dimensional array or elements. The array of compute elements can comprise a plurality of two-dimensional and three-dimensional compute element arrays. Each compute element within the array of compute elements is known to a compiler and is coupled to its neighboring compute elements within the array of compute elements. A compute element can include one or more processors, processor cores, processor macros, processor cells, and so on. Each compute element can include an amount of local storage. The local storage may be accessible by one or more compute elements. Each compute element can communicate with neighbors, where the neighbors can include nearest neighbors or more remote "neighbors". Communication between and among compute elements can be accomplished using a bus such as an industry standard bus, a ring bus, a network such as a wired or wireless computer network, etc. In embodiments, the ring bus is implemented as a distributed multiplexor (MUX). The array of compute elements can be coupled to at least one data cache. The data cache can be colocated with the array, adjacent to the array, and so on. The data cache can include a single-level cache, a multi-level cache, and the like. The data cache can be accessible to the array of compute elements via a crossbar switch. The data cache can provide memory storage such as data memory storage for the array of compute elements.

The system 800 can include a providing component 840. The providing component 840 can include control and functions for providing control for compute elements on a cycle-by-cycle basis, wherein control is enabled by a stream of wide control words generated by the compiler. The control words can be based on low-level control words such as assembly language words, microcode words, and so on. The control word can include control word bunches. In embodiments, the control word bunches can provide operational control of a particular compute element. The control of the compute elements on a cycle-by-cycle basis can include configuring the array to perform various compute operations. In embodiments, the stream of wide control words generated by the compiler provides direct, fine-grained control of the 2D array of compute elements. The compute operations can enable audio or video processing, artificial intelligence processing, machine learning, deep learning, and the like. The providing control can be based on microcode control words, where the microcode control words can include opcode fields, data fields, compute array configuration fields, etc. The compiler that generates the control can include a general-purpose compiler, a parallelizing compiler, a compiler optimized for the array of compute elements, a compiler specialized to perform one or more processing tasks, and so on. The providing control can implement one or more topologies such as processing topologies within the array of compute elements. In embodiments, the topologies implemented within the array of compute elements can include a systolic, a vector, a cyclic, a spatial, a streaming, or a Very Long Instruction Word (VLIW) topology. Other topologies can include a neural network topology. A control can enable machine learning functionality for the neural network topology.

The system 800 can include generating component 850. The generating component 850 can include control and functions for generating a load address and a store address, wherein the load address and the store address comprise memory block move addresses, and wherein the memory block move addresses point to memory storage locations in the at least one data cache. The memory block to be moved can include bytes, words, cache lines, blocks of cache lines, and so on. In embodiments, the generating a load address and a store address can be performed by one or more compute elements within a column of compute elements. The generating the load address and the store address can be based on an operation associated with the compute element. The operation can be based on one or more control words provided on a cycle-by-cycle basis. In embodiments, the load address and the store address can be generated in the same cycle. The load address can include a source address within the data cache from which a memory block can be obtained, and the store address can include a target address within the data cache to which the memory block can be written. In embodiments, the generating a load address and a store address can encompass physical address translation of the load target start address and the store target start address, respectively. The physical address translation can be accomplished by a compute element within the array of compute elements, by one or more elements that can couple the array of compute elements to the data cache, and so on. In embodiments, physical address translation can be performed by a load buffer and a crossbar switch. Performing the address translation between the load buffer and the crossbar switch can maximize the amount of time available to a translation operation.

The system 800 can include an executing component 860. The executing component 860 can include control and functions for executing a memory block move, based on the memory block move addresses, wherein data for the memory block move is transferred outside of the array of compute elements. Executing the memory block move outside of the array enables compute elements within the array to perform operations other than the data move operations, thereby freeing up cycles for task processing rather than data transfer. Recall that operations that are executed by compute elements within the array are provided on a cycle-by-cycle basis. In embodiments, a control word from the stream of wide control words can include a load target start address, a store target start address, a block size, and a stride. The load target start address and the store target start address can be translated to physical addresses as discussed previously. In embodiments, the memory block move comprises a data cache to data cache transfer. The data cache to data cache transfer enables data such as data blocks to be moved within the data cache without having to transfer the data from the source address into the compute element array and then back out to the target address within the data cache. In embodiments, the memory block move can be executed as a pseudo-atomic operation. The pseudo-atomic operation can enable only one access to the memory block that is being moved. Limiting access to the memory block that is being moved can enable the move of the memory block to be hazard free.

Discussed previously, load buffers can be coupled to the array of compute elements. Embodiments can include coupling load buffers located adjacent to at least one edge of the array of compute elements. The load buffers can also be coupled to two opposite edges of the array of compute elements to reduce propagation delays between compute elements in the array and the load buffers. In embodiments, the load buffers can provide storage for a load address, data obtained from the load address, and a dataless store address. A dataless store address can include the target address for a memory block move. The memory block move can be considered dataless since data moves between the data cache source and the data cache target without being loaded into the array and then back out to the data cache. Other elements can be provided to enable memory block moves. Further embodiments can include coupling a crossbar switch between the load buffers and the at least one data cache. The crossbar switch can enable access by any compute element within the array to the data cache. In embodiments, the crossbar switch can enable memory access anywhere within the at least one data cache.

In embodiments, the pseudo-atomic operation can provide memory hazard detection and mitigation. The hazard detection and mitigation can enable memory block moves to be executed, where the memory block moves can move data required by a variety of operations. The operations that can be performed on compute elements within the array can include arithmetic operations, Boolean operations, matrix operations, neural network operations, and the like. The operations can be executed based on the control words generated by the compiler. The control words can be provided to a control unit, where the control unit can control the operations of the compute elements within the array of compute elements. Operation of the compute elements can include configuring the compute elements, providing data to the compute elements, routing and ordering results from the compute elements, and so on. Embodiments further include generating a task completion signal. The task completion signal can include a flag, a semaphore, a message, and so on. In embodiments, the task completion signal can be based on a value in the compute element operation counter. Additional operations can also be executed. Embodiments further include executing the additional operations cooperatively among the subset of compute elements. The additional operations can include parallel operations. In embodiments, the additional operations can complete autonomously from direct compiler control. The autonomous completion of the additional operations can reduce a number of compiler instructions, free the compiler from having to keep track of detailed memory access timing issues, and so on.

The same control operations associated with control words can be executed on a given cycle across the array. The operations can provide control on a per compute element basis, where each control word can be comprised of a plurality of compute element control groups, clusters, and so on. In embodiments, a control unit can operate on compute element operations. The executing operations can include distributed execution of operations. In embodiments, the distributed execution of operations can occur in two or more compute elements within the array of compute elements. The executing operations can include storage access, where the storage can include a scratchpad memory, one or more caches, register files, etc., within the 2D array of compute elements. Further embodiments include a memory operation outside of the array of compute elements. The "outside" memory operation can include access to a memory such as a high-speed memory, a shared memory, a remote memory, etc. In embodiments, the memory operation can be enabled by autonomous compute element operation. As for other control associated with the array of compute elements, the autonomous compute element operation is controlled by the operations and the additional operations. In a usage example, operations and additional operations can be loaded into buffers to control operation of one or more compute elements. Data to be operated on by the compute element operations can be loaded. Data operations can be performed by the compute elements without loading further control word bunches for a number of cycles. The autonomous compute element operation can be based on operation looping. In embodiments, the operation looping can accomplish dataflow processing within statically scheduled compute elements. Dataflow processing can include processing based on the presence or absence of data. The dataflow processing can be performed without requiring access to external storage.

The operation that is being executed can include a data dependent branch operation. The branch operation can include two or more branches, where a branch is selected based on an operation such as an arithmetic or logical operation. In a usage example, a branch operation can determine the outcome of an expression such as A>B. If A is greater than B, then one branch can be taken. If A is less than or equal to B, then another branch can be taken. In embodiments, the compiler can calculate a latency for the data dependent branch operation. Since execution of the at least two operations is impacted by latency, the latency can be scheduled into compute element operations. In order to further speed execution of a branch operation, sides of the branch can be precomputed prior to datum A and datum B being available. When the data is available, the expression can be computed (which is a form of predication), and the proper branch direction can be chosen. The untaken branch data and operations can be discarded, flushed, etc. In embodiments, the two or more data dependent branch operations can require a balanced number of execution cycles. The balanced number of execution cycles can reduce or eliminate idle cycles, stalling, and the like. In embodiments, the balanced number of execution cycles is determined by the compiler. In embodiments, the accessing, the providing, the loading, and the executing enable background memory accesses. The background memory access enables a control element to access memory independently of other compute elements, a controller, etc. In embodiments, the background memory accesses can reduce load latency. Load latency is reduced since a compute element can access memory before the compute element exhausts the data that the compute element is processing.

The system 800 can include a computer program product embodied in a non-transitory computer readable medium for task processing, the computer program product comprising code which causes one or more processors to perform operations of: accessing an array of compute elements, wherein each compute element within the array of compute elements is known to a compiler and is coupled to its neighboring compute elements within the array of compute elements, wherein the array of compute elements is coupled to at least one data cache, wherein the data cache provides memory storage for the array of compute elements; providing control for the array of compute elements on a cycle-by-cycle basis, wherein the control is enabled by a stream of wide control words generated by the compiler; generating a load address and a store address, wherein the load address and the store address comprise memory block move addresses, and wherein the memory block move addresses point to memory storage locations in the at least one data cache; and executing a memory block move, based on the memory block move addresses, wherein data for the memory block move is transferred outside of the array of compute elements.

Each of the above methods may be executed on one or more processors on one or more computer systems. Embodiments may include various forms of distributed computing, client/server computing, and cloud-based computing. Further, it will be understood that the depicted steps or boxes contained in this disclosure's flow charts are solely illustrative and explanatory. The steps may be modified, omitted, repeated, or re-ordered without departing from the scope of this disclosure. Further, each step may contain one or more sub-steps. While the foregoing drawings and description set forth functional aspects of the disclosed systems, no particular implementation or arrangement of software and/or hardware should be inferred from these descriptions unless explicitly stated or otherwise clear from the context. All such arrangements of software and/or hardware are intended to fall within the scope of this disclosure.

The block diagrams and flowchart illustrations depict methods, apparatus, systems, and computer program products. The elements and combinations of elements in the block diagrams and flow diagrams show functions, steps, or groups of steps of the methods, apparatus, systems, computer program products and/or computer-implemented methods. Any and all such functions—generally referred to herein as a "circuit," "module," or "system"—may be implemented by computer program instructions, by special-purpose hardware-based computer systems, by combinations of special purpose hardware and computer instructions, by combinations of general-purpose hardware and computer instructions, and so on.

A programmable apparatus which executes any of the above-mentioned computer program products or computer-implemented methods may include one or more microprocessors, microcontrollers, embedded microcontrollers, programmable digital signal processors, programmable devices, programmable gate arrays, programmable array logic, memory devices, application specific integrated circuits, or the like. Each may be suitably employed or configured to process computer program instructions, execute computer logic, store computer data, and so on.

It will be understood that a computer may include a computer program product from a computer-readable storage medium and that this medium may be internal or external, removable and replaceable, or fixed. In addition, a computer may include a Basic Input/Output System (BIOS), firmware, an operating system, a database, or the like that may include, interface with, or support the software and hardware described herein.

Embodiments of the present invention are limited to neither conventional computer applications nor the programmable apparatus that run them. To illustrate: the embodiments of the presently claimed invention could include an optical computer, quantum computer, analog computer, or the like. A computer program may be loaded onto a computer to produce a particular machine that may perform any and all of the depicted functions. This particular machine provides a means for carrying out any and all of the depicted functions.

Any combination of one or more computer readable media may be utilized including but not limited to: a non-transitory computer readable medium for storage; an electronic, magnetic, optical, electromagnetic, infrared, or semiconductor computer readable storage medium or any suitable combination of the foregoing; a portable computer diskette; a hard disk; a random access memory (RAM); a read-only memory (ROM); an erasable programmable read-only memory (EPROM, Flash, MRAM, FeRAM, or phase change memory); an optical fiber; a portable compact disc; an optical storage device; a magnetic storage device; or any suitable combination of the foregoing. In the context of this document, a computer readable storage medium may be any tangible medium that can contain or store a program for use by or in connection with an instruction execution system, apparatus, or device.

It will be appreciated that computer program instructions may include computer executable code. A variety of languages for expressing computer program instructions may include without limitation C, C++, Java, JavaScript™, ActionScript™, assembly language, Lisp, Perl, Tcl, Python, Ruby, hardware description languages, database programming languages, functional programming languages, imperative programming languages, and so on. In embodiments, computer program instructions may be stored, compiled, or interpreted to run on a computer, a programmable data processing apparatus, a heterogeneous combination of processors or processor architectures, and so on. Without limitation, embodiments of the present invention may take the form of web-based computer software, which includes client/server software, software-as-a-service, peer-to-peer software, or the like.

In embodiments, a computer may enable execution of computer program instructions including multiple programs or threads. The multiple programs or threads may be processed approximately simultaneously to enhance utilization of the processor and to facilitate substantially simultaneous functions. By way of implementation, any and all methods, program codes, program instructions, and the like described herein may be implemented in one or more threads which may in turn spawn other threads, which may themselves have priorities associated with them. In some embodiments, a computer may process these threads based on priority or other order.

Unless explicitly stated or otherwise clear from the context, the verbs "execute" and "process" may be used interchangeably to indicate execute, process, interpret, compile, assemble, link, load, or a combination of the foregoing. Therefore, embodiments that execute or process computer program instructions, computer-executable code, or the like may act upon the instructions or code in any and all of the ways described. Further, the method steps shown are intended to include any suitable method of causing one or more parties or entities to perform the steps. The parties performing a step, or portion of a step, need not be located within a particular geographic location or country boundary. For instance, if an entity located within the United States causes a method step, or portion thereof, to be performed outside of the United States, then the method is considered to be performed in the United States by virtue of the causal entity.

While the invention has been disclosed in connection with preferred embodiments shown and described in detail, various modifications and improvements thereon will become apparent to those skilled in the art. Accordingly, the foregoing examples should not limit the spirit and scope of the present invention; rather it should be understood in the broadest sense allowable by law.

What is claimed is:

1. A processor-implemented method for task processing comprising:

accessing an array of compute elements, wherein each compute element within the array of compute elements is known to a compiler and is coupled to its neighboring compute elements within the array of compute elements, wherein the array of compute elements is coupled to at least one data cache, wherein the data cache provides memory storage for the array of compute elements;

providing control for the array of compute elements on a cycle-by-cycle basis, wherein the control is enabled by a stream of wide control words generated by the compiler;

generating a load address and a store address, wherein the load address and the store address comprise memory block move addresses, and wherein the memory block move addresses point to memory storage locations in the at least one data cache;

coupling load buffers located adjacent to at least one edge of the array of compute elements, wherein the load buffers provide storage for data obtained from the load address and a dataless store address; and executing a memory block move, based on the memory block move addresses, wherein data for the memory block move is transferred outside of the array of compute elements.

2. The method of claim 1 wherein the load address and the store address are generated in a same cycle.

3. The method of claim 1 wherein the memory block move comprises a data cache to data cache transfer.

4. The method of claim 1 wherein a control word from the stream of wide control words includes a load target start address, a store target start address, a block size, and a stride.

5. The method of claim 4 wherein the generating a load address and a store address encompasses physical address translation of the load target start address and the store target start address, respectively.

6. The method of claim 1 wherein the memory block move is executed as a pseudo-atomic operation.

7. The method of claim 6 wherein the pseudo-atomic operation uses memory hazard detection and mitigation.

8. The method of claim 1 wherein the memory block move that is transferred outside of the array of compute elements is enabled by the load buffers.

9. The method of claim 1 wherein the load buffers are located adjacent to two opposite edges of the array of compute elements.

10. The method of claim 1 further comprising coupling a crossbar switch between the load buffers and the at least one data cache.

11. The method of claim 10 wherein the crossbar switch enables memory access anywhere within the at least one data cache.

12. The method of claim 1 wherein the array of compute elements comprises a two-dimensional (2D) array.

13. The method of claim 12 wherein the 2D array includes rows of compute elements and columns of compute elements.

14. The method of claim 13 wherein the generating a load address and a store address is performed by one or more compute elements within a column of compute elements.

15. The method of claim 1 wherein successful completion of the memory block move occurs within one architectural cycle.

16. The method of claim 15 wherein the architectural cycle includes a plurality of clock cycles.

17. The method of claim 1 wherein the memory block move implements a load-to-store forwarding operation.

18. The method of claim 17 wherein the load-to-store forwarding operation enables hazard detection and mitigation.

19. The method of claim 1 wherein the stream of wide control words comprises variable length control words generated by the compiler.

20. A computer program product embodied in a non-transitory computer readable medium for task processing, the computer program product comprising code which causes one or more processors to perform operations of:

accessing an array of compute elements, wherein each compute element within the array of compute elements is known to a compiler and is coupled to its neighboring compute elements within the array of compute elements, wherein the array of compute elements is coupled to at least one data cache, wherein the data cache provides memory storage for the array of compute elements;

providing control for the array of compute elements on a cycle-by-cycle basis, wherein the control is enabled by a stream of wide control words generated by the compiler;

generating a load address and a store address, wherein the load address and the store address comprise memory block move addresses, and wherein the memory block move addresses point to memory storage locations in the at least one data cache;

coupling load buffers located adjacent to at least one edge of the array of compute elements, wherein the load buffers provide storage for data obtained from the load address and a dataless store address; and executing a memory block move, based on the memory block move addresses, wherein data for the memory block move is transferred outside of the array of compute elements.

21. A computer system for task processing comprising:

a memory which stores instructions;

one or more processors coupled to the memory, wherein the one or more processors, when executing the instructions which are stored, are configured to:

access an array of compute elements, wherein each compute element within the array of compute elements is known to a compiler and is coupled to its neighboring compute elements within the array of compute elements, wherein the array of compute elements is coupled to at least one data cache, wherein the data cache provides memory storage for the array of compute elements;

provide control for the array of compute elements on a cycle-by-cycle basis, wherein the control is enabled by a stream of wide control words generated by the compiler;

generate a load address and a store address, wherein the load address and the store address comprise memory block move addresses, and wherein the memory block move addresses point to memory storage locations in the at least one data cache;

couple load buffers located adjacent to at least one edge of the array of compute elements, wherein the load buffers provide storage for data obtained from the load address and a dataless store address; and execute a memory block move, based on the memory block move addresses, wherein data for the memory block move is transferred outside of the array of compute elements.

* * * * *